(12) United States Patent
Sen et al.

(10) Patent No.: US 11,301,407 B2
(45) Date of Patent: Apr. 12, 2022

(54) TECHNOLOGIES FOR ACCELERATOR FABRIC PROTOCOL MULTIPATHING

(71) Applicant: Intel Corporation, Santa Clara, CA (US)

(72) Inventors: Sujoy Sen, Beaverton, OR (US); Narayan Ranganathan, Bangalore KA (IN)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 16/242,928

(22) Filed: Jan. 8, 2019

(65) Prior Publication Data

US 2020/0218684 A1    Jul. 9, 2020

(51) Int. Cl.
| | |
|---|---|
| *G06F 11/20* | (2006.01) |
| *G06F 13/40* | (2006.01) |
| *G06F 3/06* | (2006.01) |
| *G06F 15/173* | (2006.01) |
| *G06F 9/455* | (2018.01) |
| *H04L 69/16* | (2022.01) |
| *H04L 67/141* | (2022.01) |

(52) U.S. Cl.
CPC ........ *G06F 13/4027* (2013.01); *G06F 3/0604* (2013.01); *G06F 3/067* (2013.01); *G06F 3/0619* (2013.01); *G06F 3/0647* (2013.01); *G06F 3/0664* (2013.01); *G06F 9/45558* (2013.01); *G06F 11/2007* (2013.01); *G06F 15/17331* (2013.01); *H04L 67/141* (2013.01); *H04L 69/16* (2013.01); *G06F 2009/4557* (2013.01)

(58) Field of Classification Search
CPC ........ G06F 3/06; G06F 3/0604; G06F 3/0647; G06F 11/20; G06F 11/2007
USPC ......................................................... 714/4.5
See application file for complete search history.

(56) References Cited

U.S. PATENT DOCUMENTS

| | | | | |
|---|---|---|---|---|
| 7,502,884 | B1 * | 3/2009 | Shah | H04L 67/1097 370/395.21 |
| 8,041,875 | B1 * | 10/2011 | Shah | H04L 41/04 710/316 |
| 8,180,949 | B1 * | 5/2012 | Shah | G06F 3/0662 710/316 |
| 8,291,148 | B1 * | 10/2012 | Shah | G06F 3/0601 710/316 |

(Continued)

OTHER PUBLICATIONS

F. Abel et al., "An FPGA Platform for Hyperscalers", Aug. 29, 2017, 5 pages.

(Continued)

*Primary Examiner* — Kamini B Patel
(74) *Attorney, Agent, or Firm* — Compass IP Law PC

(57) ABSTRACT

Technologies for accessing pooled accelerator resources over a network fabric are disclosed. In disclosed embodiments, an application hosted by a computing platform accesses remote accelerator resources over a network fabric using protocol multipathing mechanisms. A communication session is established with the remote accelerator resources. The communication session comprises at least two connections. The at least two connections at least include a first connection having or utilizing a first transport layer and a second connection having or utilizing a second transport layer that is different than the first transport layer. Other embodiments may be disclosed and/or claimed.

29 Claims, 10 Drawing Sheets

(56) References Cited

U.S. PATENT DOCUMENTS

| | | | | |
|---|---|---|---|---|
| 8,677,023 | B2* | 3/2014 | Venkataraghavan | G06F 13/4221 709/250 |
| 2012/0254587 | A1* | 10/2012 | Biran | G06F 9/3877 712/34 |
| 2013/0145072 | A1* | 6/2013 | Venkataraghavan | G06F 11/2005 710/316 |
| 2017/0116021 | A1* | 4/2017 | Miller | H04L 41/12 |
| 2018/0219797 | A1* | 8/2018 | Sen | H04L 67/34 |
| 2019/0007334 | A1* | 1/2019 | Guim Bernat | H04L 67/16 |
| 2019/0034363 | A1* | 1/2019 | Palermo | G06F 13/4022 |
| 2019/0044812 | A1* | 2/2019 | Loftus | H04L 41/0896 |
| 2019/0213029 | A1* | 7/2019 | Liu | G06F 15/7867 |
| 2019/0297015 | A1* | 9/2019 | Marolia | H04L 49/9068 |
| 2020/0057685 | A1* | 2/2020 | Schardt | G06F 9/5061 |

OTHER PUBLICATIONS

Patrick Geoffra, Ph.D., "A Critique of RDMA", Aug. 18, 2006, 15 pages.

Chuanxiong Guo et al., "RDMA over Commodity Ethernet at Scale", 2016, 14 pages.

"Supplement to InfiniBand Architecture Specification", Sep. 2, 2014, 23 pages, vol. 1, Release 1.2.1.

"InfiniBand Architecture Specification", Nov. 2, 2016, 639 pages, vol. 2, Release 1.3.1.

"Intel Ethernet Switch FM5000/FM6000", Jul. 2017, 352 pages.

"Designing Slides into Electronic Enclosures" 2011, 20 pages, Accuride International Inc.

Radisys Datasheet, "DCEngine Compute Sled—Hyperscale Infrastructure for Communication Service Providers", Nov. 2017, 2 pages.

Renato Recio, "A Tutorial of the RDMA Model", Sep. 15, 2006, 16 pages.

Intel, "Accelerator Functional Unit (AFU) Developer's Guide", Aug. 6, 2018, 44 pages.

Matt Nielson et al., "SPI Configuration and Flash Programming in UltraScale FPGAs", Oct. 20, 2017, 43 pages, v1.2.

Yuanwei Lu et al., "Multi-Path Transport for RDMA in Datacenters", Apr. 2018, 15 pages.

InfiniBand Architecture, "Chapter 3: Architectural Overview", Mar. 3, 2015, pp. 93-149, vol. 1, Release 1.3.

InfiniBand Architecture, "Chapter 9: Transport Layer", Mar. 3, 2015, pp. 242-448, vol. 1, Release 1.3.

"Choosing a network adapter for your virtual machine (1001805)", my vmware, Copyright © 2021 VMware, Inc., https://kb.vmware.com/s/article/1001805 Apr. 26, 2018, 7 pages.

"Hyper-V Technology Overview", Applies to: Windows Server 2016, Microsoft Hyper-V Server 2016, Windows Server 2019, Microsoft Hyper-V Server 2019, https://docs.microsoft.com/en-us/windows-server/virtualization/hyper-v/hyper-v-technology-overview, Nov. 29, 2016, 6 pages.

"NIC Teaming", Applies to: Windows Server (Semi-Annual Channel), Windows Server 2016, Sep. 10, 2018, downloaded from https://docs.microsoft.com/en-us/windows-server/networking/technologies/nic-teaming/nic-teaming, 10 pages.

Arthur Kiyanovski, "The Real Difference Between Emulation and Paravirtualization of High-Throughput I/O Devices", Technion—Computer Science Department—M.Sc. Thesis MSC-2017-19, Aug. 2017, Haifa, 105 pages.

Postel, J., "User Datagram Protocol", Internet Standard, https://tools.ietf.org/html/rfc768, Aug. 28, 1980, 5 pages.

Qemu, "Documentation/Networking-Network Basics", https://wiki.qemu.org/Documentation/Networking, Nov. 20, 2019, 8 pages.

Sander Vrijders et al., "Reducing Complexity of Virtual Machine Networking", IEEE Communications Magazine, vol. 54, No. 4, pp. 152-158, 2016.

Siron, Eric, "How to Work with Hyper-V Virtual Network Adapters", https://www.altaro.com/hyper-v/work-hyper-v-virtual-network-adapters, Jul. 14, 2016, 24 pages.

Van Hoye, Didier, "Forcing the affinity of a virtual NIC to a physical NIC with a SET vSwitch via Set-VMNetworkAdapterTeamMapping", https://www.starwindsoftware.com/blog/forcing-the-affinity-of-a-vnic-to-a-pnic-with-a-set-vswitch, Sep. 20, 2017, 14 pages.

* cited by examiner

TECHNOLOGIES FOR ACCELERATOR FABRIC PROTOCOL MULTIPATHING

FIELD

The present application is related to computing, and in particular, to technologies that allow computing systems to use remote hardware accelerators.

BACKGROUND

Certain computing tasks may be performed more quickly by a hardware accelerator, such as a field programmable gate array (FPGA), application specific integrated circuit (ASIC), or graphics processing unit (GPU), than by a central processing unit. Compute devices are increasingly employing hardware accelerators in order to perform suitable computing tasks more quickly. In many applications, the accelerators may be locally accessible to a central processing unit using a Peripheral Component Interconnect Express (PCIe) or similar connection.

One drawback with the incorporation of a hardware accelerator into a compute device is that the hardware accelerator may be unused much of the time. Depending on the particular task being performed by the compute device, the hardware accelerator may experience a high level of use some times and a low or no level of use at other times, which may be an inefficient allocation of resources.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
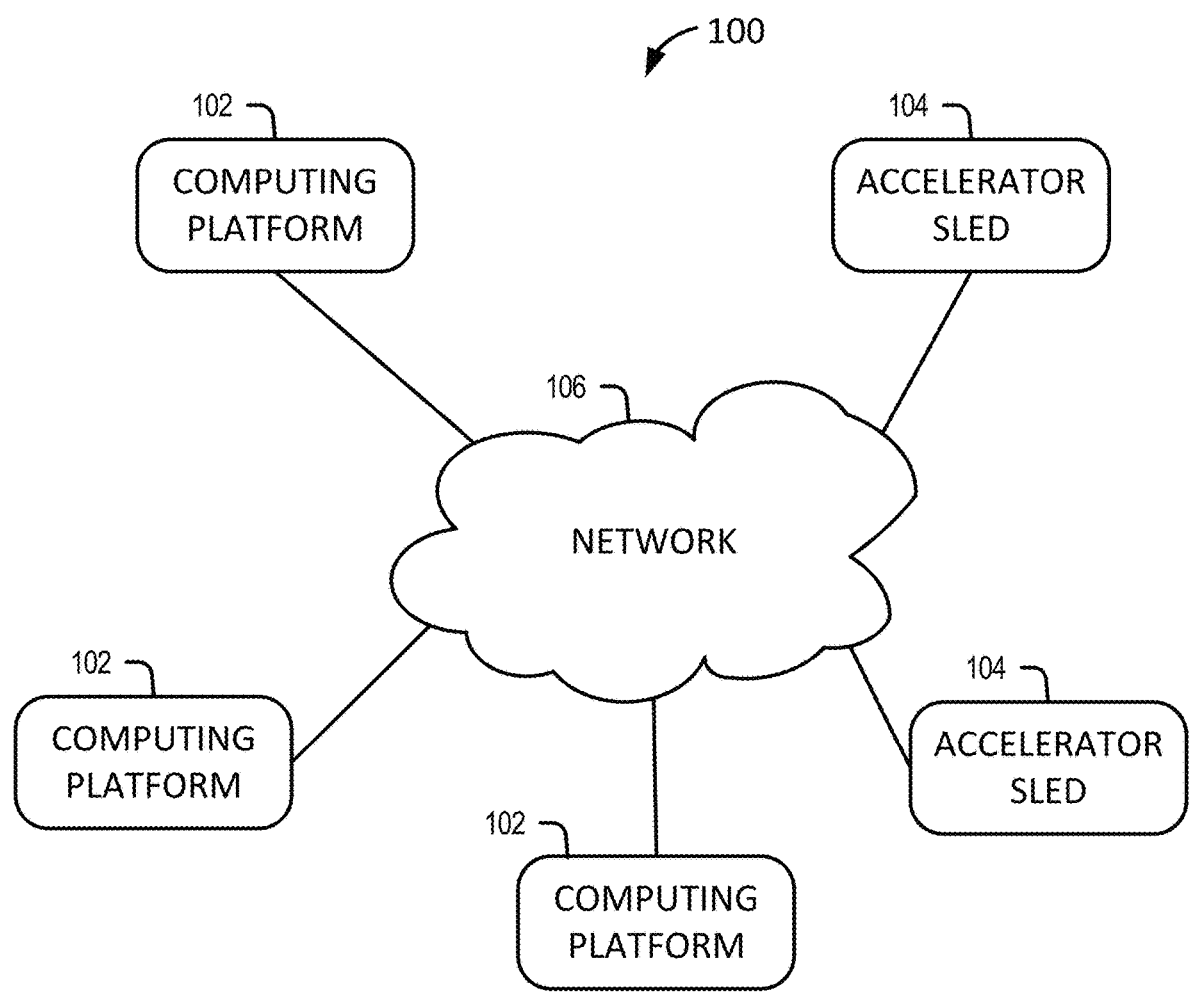
FIG. 1 illustrates an example hardware accelerator fabric architecture according to various embodiments.

Disclosed embodiments are related to computing with hardware acceleration, and in particular, to mechanisms that allow computing systems to use remote hardware accelerators that are not incorporated in, or attached to, computing systems. Hardware accelerators are used to perform one or more tasks more quickly and/or more efficiently than central processing units. Usually, hardware accelerators are physically coupled to a central processing unit within a computing system (e.g., a server) via a suitable interconnect technology, such as Peripheral Component Interconnect Express (PCIe). One drawback to incorporating hardware accelerators into computing systems is that this implementation results in an inefficient allocation of acceleration resources. For example, depending on the particular task being performed, the hardware accelerator may experience a high level of use during some time periods and a low or no level of use at other times.

Accelerator fabrics were developed to utilize hardware acceleration resources in a more efficient manner. An accelerator fabric is an architecture in which computing systems are communicatively coupled with hardware accelerators via a network fabric (e.g., Ethernet, Fibre Channel (FC), etc.) where individual computing systems can select a particular hardware accelerator from a pool of remote hardware accelerators to perform a suitable task. The accelerator fabric uses a network protocol (e.g., link layer protocol) to communicate with the remote hardware accelerators, which also requires some sort of transport layer protocol (e.g., Transmission Control Protocol (TCP), User Datagram Protocol (UDP), Remote Direct Memory Access (RDMA), etc.) on top of the network protocol to actually transfer data packets. When the transport protocol is RDMA, the network interface controller (NIC) of the computing system performs all of the transport layer functionality, such as maintaining a state of the connection, counting and performing transmission retries, flow control, etc.

One advantage of the accelerator fabric architecture is that specific tasks or applications do not have to be provided to a specific computing system for execution; instead, a computing system can pick and choose particular tasks to be operated by corresponding hardware accelerators. Another advantage of using an accelerator fabric architecture is that it allows applications running inside virtual machines (VMs), or VMs themselves, to migrate between physical computing systems. This is because a VM application running on a local system with a locally attached hardware accelerator has to migrate to a target system with an identical hardware setup as the current computing system, which is not necessary for the accelerator fabric. However, migrating a VM in an accelerator fabric that uses RDMA becomes difficult because a RDMA connection state has to be migrated as well. In other words, in order to migrate a VM from a local system to a target system, the RDMA connection state in the NIC of the local system has to be transferred to a NIC of the target system. Current techniques for migrating RDMA connection states are error prone and cumbersome. Other transport protocols, such as TCP, are easier to migrate because they run inside the VM instead of being run by the NIC. A drawback to using these transport protocols is that they generally do not perform as well as RDMA According to various embodiments, protocol level multipathing is used to migrate VMs between physical machines. In embodiments, an initiator running on a first computing system establishes a session with a remote hardware accelerator for an application running on the first computing system. In these embodiments, the session includes at least two connections, where one of the at least two connections uses a different transport protocol than other ones of the at least two connections. For example, an RDMA transport protocol and a TCP transport protocol. The VM application uses a first connection of the first transport protocol (e.g., RDMA) when the VM is operating on the first computing system (e.g., in a steady state). The initiator switches to the second connection of the second transport protocol (e.g., TCP) when the VM is to be migrated to a target computing system. After the migration takes place, the initiator switches back to the first connection. In addition, the initiator switches to the second connection when the first connection fails or breaks, and allow the VM application to use the first connection when the first connection is re-established (which may be done by the initiator or the NIC depending on the transport protocol of the first connection).

I. ACCELERATOR FABRIC EMBODIMENTS

Referring now to FIG. 1, an arrangement 100 for the pooling of accelerators includes one or more computing platforms 102 and one or more accelerator sleds 104 which are communicatively connected together by an illustrative network 106, is shown. In some embodiments, the arrangement 100 may be one or more data centers comprising a large number of racks that can contain numerous types of hardware and/or configurable resources including the computing platforms 102, accelerator sleds 104, among others such as memory resources, storage resources, networking resources, cooling resources, power resources, etc. The types of hardware or configurable resources deployed in data centers may also be referred to as "physical resources" or "disaggregate elements." These physical resources can be pooled to form virtual computing platforms for a large number and variety of computing tasks. The physical resources may be housed within individual sleds, and one or more racks are arranged to receive a number of sleds. For example, one or more computing platforms 102 may be housed in individual sleds. Additionally, as discussed in more detail infra, the accelerator sleds 104 may house a number of hardware accelerators 312 with other elements, such as a host fabric interface (e.g., host fabric interface 310 of FIG. 3).

In the illustrated embodiment, a computing platform 102 (also referred to as a "host platform 102" or the like) may access a hardware accelerator 212 (see FIG. 2) that is local to the computing platform 102, or the computing platform 102 may access a hardware accelerator 312 (see FIG. 3) on an accelerator sled 104 remote from the computing platform 102. In particular, in the illustrated embodiment, an application or virtual machine (VM) being executed by a processor 202 of the computing platform 102 (see FIG. 2) may access a hardware accelerator 212 or 312 (see FIGS. 2 and 3) in a manner that is transparent to the application or VM. For example, the application may access an application program interface (API), and the API is used to transparently perform the requested function on either a local hardware accelerator 212 or a remote hardware accelerator 312 without requiring any involvement from the underlying application. The API may select a local hardware accelerator 212 or a remote hardware accelerator 312 based on any number of factors, such as the physical presence or absence of the local hardware accelerator 212 and/or the remote hardware accelerator 312, a present usage of the local hardware accelerator 212 and/or the remote hardware accelerator 312, a configuration setting of the computing platform 102 that may be set by an administrator of the arrangement 100, etc. As used herein, the terms "remote accelerator sled 104" and "remote hardware accelerator 312" may refer to hardware accelerators or accelerator resources that are not directly attached or coupled to a subject computing platform 102. Although the present disclosure discusses embodiments in the context of remote hardware accelerators 312 being included in accelerator sleds 104, the embodiments are also applicable to other suitable accelerator pooling arrangements, such as where a first computing platform 102 accesses a hardware accelerator of a second computing platform 102 (where the hardware accelerator is a remote hardware accelerator 312 from the perspective of the first computing platform 102 and is a local hardware accelerator 212 from the perspective of the second computing platform 102).

The network 106 (also referred to as a "network fabric 106" or the like) may be embodied as any type of network capable of communicatively connecting the computing platforms 102 and the accelerator sleds 104. For example, the arrangement 100 may be embodied as a high performance computing system or a data center, and the network 106 may be established through a series of cables, switches, and other devices connecting the various computing platforms 102 and accelerator sleds 104 of the data center. In embodiments, the network 106 may be a network fabric employing any suitable network topology in which components pass data to each other through interconnecting switches or other like interconnection elements. As discussed in more detail infra, the computing platforms 102 and accelerator sleds 104 may each access the network 106 using a standard network interface protocol such as Ethernet, Ethernet over GRE Tunnels, Ethernet over Multiprotocol Label Switching (MPLS), Ethernet over USB, a message passing interface (MPI), a Fiber Distributed Data Interface (FDDI), Fibre Channel Protocol (FCP) including switched fabric, point-to-point, and arbitrated loop topologies, or some other suitable protocol. Network connectivity may be provided to/from the compute devices 102 and accelerator sleds 104 via respective network interface connectors using physical connections, which may be electrical (commonly referred to as a "copper interconnect"), optical, or wireless.

Figure 2:
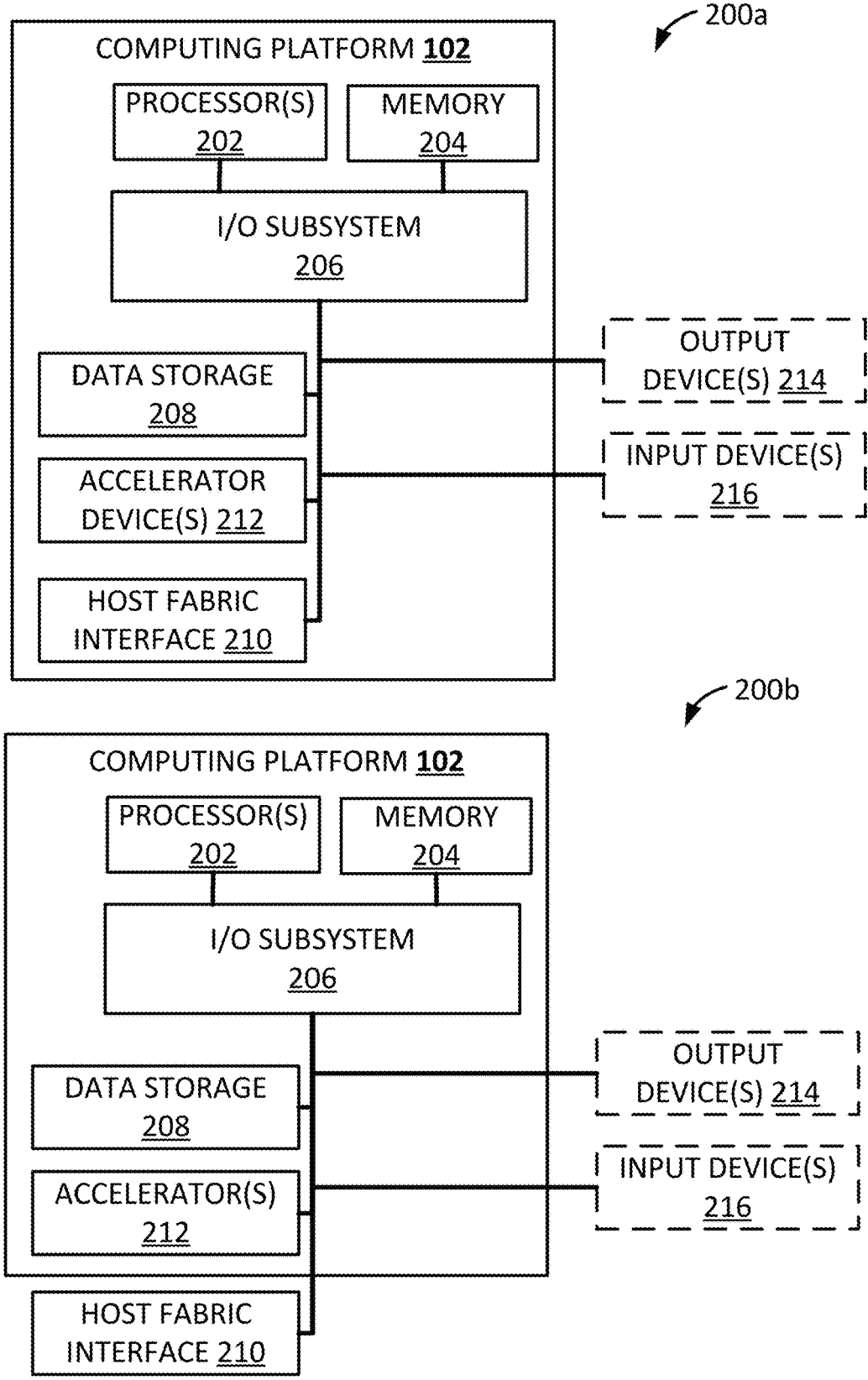
FIG. 2 illustrates an example compute device according to various embodiments.

Referring now to FIG. 2, which shows two example embodiments of a computing platform 102 of the arrangement 100. The computing platform 102 may be embodied as any type of compute device or system capable of performing the functions described herein. The term "computing platform" as used herein may refer to one or more integrated circuits (ICs), System-on-Chip (SoC), System-in-Package (SiP), Multi-Chip-Package (MCP), Computer-on-Module (CoM), etc. by itself or included on a carrier board or other like a printed circuit board (PCB) with one or more other ICs. In various embodiments, the computing platform 102 be incorporated within a chassis of a larger system. For example, the computing platform 102 may be embodied as or otherwise be included in, without limitation, a server computer, a desktop computer, a sled or blade of a rack, a smartphone, a cellular phone, a wearable computer, an embedded computing system, a tablet computer, a notebook computer, a laptop computer, a handset, a messaging device, a camera device, a multiprocessor system, a processor-based system, a consumer electronic device, and/or any other computing device.

A first embodiment 200a of the computing platform 102 includes one or more processors 202, a memory 204, input/output (I/O) subsystem 206, data storage 208, host fabric interface 210, and one or more accelerator devices 212. In the first embodiment 200a, the computing platform 102 may be communicatively coupled with one or more input devices 214 and/or one or more output devices 216. A second embodiment 200b of the computing platform 102 includes the processor(s) 202, the memory 204, the I/O subsystem 206, the data storage 208, and the one or more hardware accelerators 212, and is also communicatively coupled with the host fabric interface 210. In some embodiments, one or more of the illustrative components of either embodiment 200a and 200b of the computing platform 102 may be incorporated in, or otherwise form a portion of, another component or device. For example, the memory 204, or portions thereof, may be incorporated in or with the processor 202 as a System-on-Chip (SoC), System-in-Package (SiP), or the like.

The processor(s) 202 may be embodied as any type of processing device capable of executing program code and/or sequentially and automatically carrying out a sequence of arithmetic or logical operations and recording, storing, and/or transferring digital data to perform the functions described herein. For example, the processor 202 may be embodied as a single or multi-core processor(s), a single or multi-socket processor, single or multi-core digital signal processor(s), programmable logic device(s), microcontroller(s), or other processor or processing/controlling circuit(s). The processor(s) 202 include circuitry such as, but not limited to one or more processor cores; one or more of cache memory elements and/or on-chip memory circuitry; low drop-out voltage regulators (LDOs); interrupt controllers; serial interfaces such as serial peripheral interface (SPI), inter-integrated circuit ($I^2C$) or universal programmable serial interface circuits; real time clock (RTC) and/or clock generator; timer-counters including interval and watchdog timers; general purpose input-output (I/O) controllers; memory card controllers; interconnect (IX) controllers and/or interfaces; universal serial bus (USB) interfaces; mobile industry processor interface (MIPI) interfaces; Joint Test Access Group (JTAG) test access ports; and/or other like components. The cache memory and/or on-chip memory circuitry may include any suitable volatile and/or non-volatile memory, such as DRAM, SRAM, EPROM, EEPROM, Flash memory, solid-state memory, and/or any other type of memory device technology, such as those discussed herein. As examples, the processor(s) 202 may include Intel® Core™ based processor(s) and/or Xeon® processor(s); Advanced Micro Devices (AMD) Zen® Core Architecture processor(s), such as Epyc® processor(s), Opteron™ series Accelerated Processing Units (APUs), and/or MxGPUs; Centrig™ processor(s) from Qualcomm® Technologies, Inc., MIPS-based processor(s) provided by MIPS Technologies, Inc. such as Warrior P-class processor(s); ARM Cortex-A, Cortex-R, and Cortex-M family of processor(s) as licensed from ARM Holdings, Ltd.; POWER architecture processor(s) from the OpenPOWER Foundation™ and IBM®; ThunderX2® processor(s) provided by Cavium™, Inc.; or the like.

Similarly, the memory 204 may be embodied as any type of volatile (e.g., random access memory (RAM), dynamic RAM (DRAM), synchronous DRAM (SDRAM), etc.) and/or non-volatile memory (e.g., read only memory (ROM), high-speed electrically erasable memory (commonly referred to as "flash memory"), phase-change RAM (PRAM), resistive memory such as magnetoresistive random access memory (MRAM), etc.) capable of performing the functions described herein. The memory 204 may provide primary storage from which the processor(s) 202 continuously or periodically reads instructions stored therein for execution. In some embodiments, the memory 204 represents on-die memory or registers associated with the processor(s) 202. In some embodiments, the memory 204 may also comprise persistent storage devices, which may be temporal and/or persistent storage of any type, including, but not limited to, non-volatile memory, optical, magnetic, and/or solid state mass storage, and so forth.

The I/O subsystem 206, which may be embodied as circuitry and/or components to facilitate input/output operations among the processor(s) 202, the memory 204, and other components of the computing platform 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with one or more processor(s) 202, the memory 204, and/or other components of the computing platform 102 on a single integrated circuit chip.

The data storage 208 may be embodied as any type of device or devices configured for the short-term or long-term storage of data. For example, the data storage 208 may include any one or more memory devices and circuits, memory cards, hard disk drives (HDDs), micro HDDs, solid-state drives, flash memory cards (e.g., SD cards, microSD cards, xD picture cards, and the like), USB flash drives, resistance change memories, phase change memories, holographic memories, or chemical memories, and/or other data storage devices.

In operation, the memory 204 and/or data storage 208 store various data and computational logic used during operation of the computing platform 102 such as (OSs), applications, The computational logic (or "modules") is stored in the form of software, firmware, microcode, or hardware-level instructions to implement the techniques described herein. The computational logic may be employed to store working copies and/or permanent copies of programming instructions for the operation of various components of the computing platform 102, operating systems of the computing platform 102, one or more applications, programs, libraries, APIs, and drivers, etc. for carrying out the embodiments discussed herein (such as one or more operations of processes 600, 700, 900, 1000, and 1100 of FIGS. 6-7 and 9-11). The computational logic may be stored or loaded into memory 204 as instructions, which are then accessed for execution by the processor(s) 202 to carry out the functions described herein. The various elements may be implemented by assembler instructions supported by processor(s) 202 or high-level languages that may be compiled into instructions to be executed by the processor(s) 202. The permanent copy of the programming instructions may be placed into the data storage 208 or memory 204 in the factory or in the field through, for example, a distribution medium (not shown), through a communication interface (e.g., from a distribution server (not shown)).

The host fabric interface 210 is embodied as any type of interface circuitry capable of interfacing the computing platform 102 with individual hardware accelerators 312 of accelerator sleds 104 via the network 106. The host fabric interface 210 is also capable of interfacing the computing platform 102 with other computing platforms 102 via the network 106. The host fabric interface 210 may also be referred to and/or be embodied as a network interface controller (NIC). The host fabric interface 210 may be capable of interfacing with any appropriate cable type, such as an electrical cable or an optical cable, via a suitable input connector (e.g., ports, receptacles, sockets, etc.) that is configured to receive a corresponding output connectors (e.g., plugs, pins, etc.). The host fabric interface 210 may be configured to use any one or more communication technology and associated protocols such as those discussed herein. The host fabric interface 210 may include one or more dedicated memory and processors, ASICs, FPGAs, etc. to modulate data for transmission and de-modulate received signals according to one or more of the protocols discussed herein. Additionally or alternatively, in some embodiments, the host fabric interface 210 may include a pipeline architecture in which at least some of the functions performed by the host fabric interface 210 are performed by dedicated hardware devices or sub-components. As shown by FIG. 2, in a first embodiment 202*a* the host fabric interface 210 may be in an MCP with the processor(s) 202 or in an SoC with the processor 202. Furthermore, in a second embodiment 202*b*, the host fabric interface 210 may be in a package separate from the processor(s) 202.

In use, the host fabric interface 210 may be capable of directly accessing certain portions of the memory 204 based on instructions from the computing platform 102 or based on messages received from other computing platforms 102, including reading from and writing to those portions of the memory 204. Additionally, the host fabric interface 210 may be capable of performing a particular interface, standard, or protocol, such as the transmission control protocol (TCP), stream control transmission protocol (SCTP), user datagram protocol (UDP), the Direct Data Placement Protocol (DDP), Intel® Omni-Path Architecture, the Portals 4.0 Network Programming Interface, published by Sandia National Labs in November 2012 with designation SAND2012-10087, the Message Passing Interface Standard Version 3.1 (MPI 3.1), published by the Message Passing Interface Forum on Jun. 4, 2015, the Intel® Performance Scaled Messaging (PSM) protocol, a Remote Direct Memory Access (RDMA) based protocol such as the Internet Small Computer System Interface (iSCSI) Extensions for RDMA (iSER) protocol, the RDMA over Converged Ethernet (RoCE) standard published on Apr. 6, 2010 by the InfiniBand™ Trade Association (IBTA), RoCEv2 standard published on Sep. 2, 2014 by the IBTA, the InfiniBand™ over Ethernet (IBoE) or Internet Protocol over InfiniBand™ (IPoIB), the internet Wide Area RDMA Protocol (iWARP) compatible with some or all of the Requests for Comments (RFC) 5040 (dated October 2007), 5041 (dated October 2007), 5042 (dated October 2007), 5043 (dated October 2007), 5044 (dated October 2007), 6580 (dated April 2012), 6581 (dated April 2014), and 7306 (dated June 2014) published by the Internet Engineering Task Force (IETF), or similar operations that may employ direct memory access or a partitioned global address space (PGAS). In embodiments where an RDMA transport protocol is used, the host fabric interface 210 may be an RDMA enabled NIC (RNIC).

According to various embodiments, a unified architecture or protocol stack is created that allows an application (e.g., application 820 of FIG. 8) hosted by the computing platform 102 to use both the locally attached accelerator 212 and remotely attached accelerators (e.g., one or more of hardware accelerators 312 of FIG. 3) (collectively referred to as "accelerator resources" or the like) over a network fabric 106. In these embodiments, the application (e.g., application 820 of FIG. 8) may access accelerator resources using an accelerator application interface (e.g., an accelerator API) that provides abstractions for accelerator resources in a compute environment, such as a VM (e.g., VM 815 of FIG. 8).

The accelerator application interface includes an accelerator library used to access accelerator resources. The accelerator library may be an accelerator specific run-time library (e.g., Open Computing Language (OpenCL), CUDA, Open Programmable Acceleration Engine (OPAE) API, or the like) that provides mapping of application constructs on to a hardware accelerator context. The accelerator library uses device libraries to abstract device-specific details into an API that provides the necessary translation to device-specific interfaces via corresponding device drivers. According to various embodiments, the accelerator library also uses individual transport definitions to abstract transport-specific details into an API that provides the necessary translation to transport-specific interfaces via corresponding transport protocols. The device library at the computing platform 102 is used to connect the application(s) to one or more local devices, such as a local hardware accelerator 212. Similarly, the transport definition is used to connect the application (e.g., application 820 of FIG. 8) to a remote hardware accelerator 312 resident in the accelerator sled 104. The transport definition allows applications to send commands and data to a target hardware accelerator (e.g., one or more of hardware accelerators 312 of FIG. 3) and receive data from the target hardware accelerator (e.g., one or more of hardware accelerators 312 of FIG. 3) without requiring knowledge of the underlying transport protocols (e.g., transport layers 823, 824 of FIG. 8) being used. In some embodiments, bindings are used to link the device libraries and transport definitions with device drivers and transport protocols, respectively. Bindings involve a process or technique of connecting two or more data elements or entities together. Bindings allows the accelerator library to be bound to multiple protocols, including one or more IX protocols and one or more transport protocols.

The transport definition is independent of the transport protocols that are used to carry data to remote accelerator resources. In this way, the transport layers (e.g., transport layers 823, 824 of FIG. 8) may provide seamless and transparent access to remote accelerator resources. Each of the transport layers (e.g., transport layers 823, 824 of FIG. 8) may include primitives such as read/write data from/to device; process device command; get/set device properties; and event subscription and notification. The transport layers (e.g., transport layers 823, 824 of FIG. 8) may also have mechanisms to allow scalable and low latency communication, such as send/receive queue pairs for asynchronous request and response processing; control and data path independence via Independent queue pairs for administration and data path; and protocol independent format definition allowing for multiple protocol bindings.

In various embodiments, the transport format used for communicating data between computing platform 102 and remote accelerator resources is based on a capsule, segment, datagram, packet, or other like protocol data unit (PDU) that includes a header section and a payload section. In some embodiments, the header portion may be a command header that contains information about a request or response being sent. In some embodiments, the payload section may be a data payload or a Scatter Gather List (SGL). In these embodiments, the payload section contains the data associated with a command (i.e., a request or response). The use of either data or SGL allows different protocols to transport commands and data in an efficient manner. For example, where a transport layer (e.g., transport layer 824 of FIG. 8)

is an RDMA-based transport protocol layer, the transport layer (e.g., transport layer 824 of FIG. 8) can use an SGL payload section to transport rkeys and leverage RDMA Read/Write for direct data transfers.

The accelerator(s) 212 may be embodied as any type of device(s) capable of performing certain computing tasks more quickly or more efficiently relative to the processor 202. For example, the hardware accelerator 212 may be particularly well suited for tasks such as matrix multiplication, implementing a neural network, image processing, etc. The hardware accelerator 212 may be embodied as one or more of the same or similar devices as the hardware accelerators 312 discussed herein. It should be appreciated that in some embodiments the computing platform 102 may not include a local accelerator 212.

The components of the computing platform 102 may be connected to one another through any suitable interconnect (IX) technology, such as industry standard architecture (ISA), extended ISA (EISA), inter-integrated circuit ($I^2C$), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® Quick-Path interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX may be a proprietary bus, for example, used in a SoC based system.

In some embodiments, the computing platform 102 may include additional components, such as a one or more output devices 214 and/or one or more input devices 216. The output device(s) 214 and input device(s) 216 include one or more user interfaces designed to enable user interaction with the computing platform and/or peripheral component interfaces designed to enable peripheral component interaction with the computing platform 102. Some or all of the input device(s) 214 and/or output device(s) 216 may be communicatively coupled with the computing platform 102 via a peripheral component interface. Peripheral component interfaces may include, but are not limited to, non-volatile memory ports, a universal serial bus (USB) ports, Thunderbolt interface ports, audio jacks, a power supply interface, etc.

The input device(s) 216 include any physical or virtual means for accepting an input including, inter alia, one or more physical or virtual buttons (e.g., a reset button), a physical keyboard, keypad, mouse, touchpad, touchscreen, microphones, scanner, headset, cameras, and/or the like.

The output device(s) 214 are used to show or convey information including data and/or graphics. The output device(s) 214 may include any number and/or combinations of audio or visual display, including, inter alia, one or more simple visual outputs/indicators (e.g., binary status indicators (e.g., light emitting diodes (LEDs)), multi-character visual outputs, or more complex output devices where output characters, graphics, multimedia objects, and the like are generated or produced from the operation of the computing platform 102. These more complex output devices may be embodied as any type of display on which information may be displayed to a user of the computing platform 102, such as a liquid crystal display (LCD), a light emitting diode (LED) display, a quantum dot display, a cathode ray tube (CRT) display, a plasma display, an image projector (e.g., 2D or 3D), a laser projector, a touchscreen display, a heads-up display, and/or other display technology. The output device(s) 214 may also include speakers or other audio emitting devices, printer(s), actuators (e.g., an actuator to provide haptic feedback or the like), and/or the like.

Figure 3:
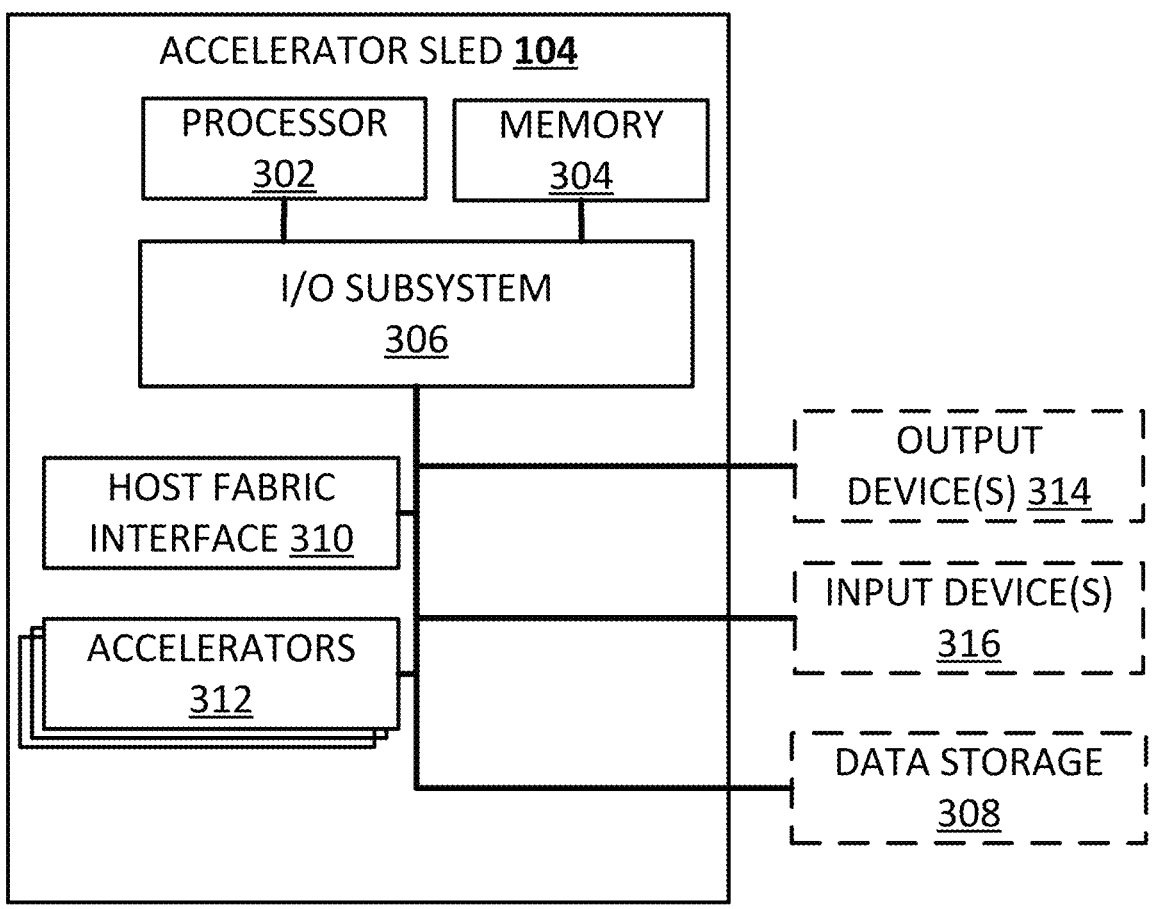
FIG. 3 illustrates an example accelerator sled according to various embodiments.

Referring now to FIG. 3, which shows an illustrative embodiment of the accelerator sled 104 of the arrangement 100. The accelerator sled 104 may be embodied as any type of compute device capable of performing the functions described herein. In the illustrative embodiment, the accelerator sled 104 is embodied as a sled or blade of a rack in a data center. The term "sled" as used herein may refer one or multiple physical resources contained in a housing that is configured to be mounted in a rack. Additionally or alternative, the accelerator sled 104 may be embodied as or otherwise be included in, without limitation, a server computer, a desktop computer, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device.

The accelerator sled 104 may include one or more processor(s) 302, memory 304, I/O subsystem 306, a host fabric interface 310, and a pool of hardware accelerators 312. In some embodiments, the accelerator sled 104 may be communicatively coupled with, or may include, one or more output devices 314, one or more input devices 316, and data storage 312. Each of the processor 302, the memory 304, the I/O subsystem 306, the one or more hardware accelerators 312, the host fabric interface 310, the data storage 312, the output device(s) 314, and the input device(s) 316 may be similar to the corresponding components of the computing platform 102. As such, the description of those components of the computing platform 102 is equally applicable to the description of those components of the accelerator sled 104 and is not repeated herein in the interest of clarity of the description. However, it should be appreciated that, in some embodiments, the architecture or configuration of the accelerator sled 104 may be significantly different from the architecture or configuration of the computing platform 102. For example, the accelerator sled 104 may have a processor 302 that is relatively slow as compared to the processor(s) 202, and the accelerator sled 104 may include several hardware accelerators 312 that are relatively powerful as compared to the hardware accelerator 212 of the computing platform 102 (in embodiments where the computing platform 102 has a hardware accelerator 212). In another example, the host fabric interface 310 may be a network switch, switching hub, network bridge, or some other networking circuitry configured to use packet switching to couple the various components of the accelerator sled 104 with each other and with other external devices.

In various embodiments, a controller, such as the processor 302 or a controller of the host fabric interface 310, may expose accelerator resources to computing platforms 102 and provide/manage connectivity to the accelerator resources over the network fabric 106. In some embodiments, the individual hardware accelerators 312 comprise controllers or other like mechanisms to provide and manage the communication sessions on their own. A unit of work or processing provided by individual hardware accelerators 312 (e.g., accelerator resources) that is exposed by the controller can be a virtual slice of the actual hardware accelerators 312 allowing multiple applications to utilize the same physical hardware accelerator 312. As discussed in more detail infra, the controller is responsible for exposing the hardware accelerators 312 in the accelerator sled 104 over the network fabric 106 using one of a plurality of network connections during a communication session.

The hardware accelerators 312 may be microprocessors, GPUs, configurable hardware (e.g., field-programmable gate arrays (FPGAs), programmable Application Specific Integrated Circuits (ASICs), programmable SoCs, digital signal processors (DSP), etc.), or some other suitable special-purpose processing device tailored to perform one or more specific tasks. For example, an application hosted by a computing platform 102 may be accelerated by transferring individual functions (or portions thereof) to an individual hardware accelerator 312 over the network 106. For each function, program code, data, etc. to be transferred for acceleration, a workload of that particular function may be determined, and program code or data of that function may be sent to one or more by the hardware accelerators 312. Outputs produced by the hardware accelerators 312, based on execution of the program code and/or the input data, may be provided to the function implemented by the processor(s) 202 over the network 106. As examples, the hardware accelerators 312 may be NVIDIA® DGX-2™ GPUs, Intel® FPGAs such as Stratix® FPGAs, Intel® Arria® FPGAs, and Cyclone® FPGAs; Kintex® UltraScale™ provided by Xilinx®, or the like.

In one example, the hardware accelerators 312 are implemented as FPGAs including one or more configurable logic blocks (CLBs) or logic cells comprising lookup-tables (LUTs) and flip-flops, one or more memory cells (e.g., block RAM (BRAM), EPROM, EEPROM, flash memory, SRAM, anti-fuses, etc. used to store logic blocks, logic fabric, data, etc.), DSP slices, serial data transceivers, input/output (I/O) blocks, and/or other like components. Some or all of these elements may be arranged as one or more accelerator function units (AFUs). The AFUs are regions within the hardware accelerators 312 that are loaded with computational logic call "accelerator images." The accelerator images comprise executable code (e.g., bitstreams, logic blocks, logic fabric, etc.) and relevant metadata that is loaded into the AFUs to provide acceleration for various functions or workloads offloaded from the computing platform 102. The metadata may indicate information on AFU characteristics and operational parameters and may be defined in a separate extensible markup language (XML), JavaScript Object Notation (JSON), or other suitable file. For example, an AFU engine or developer utility (not shown), when operated by a processor 202, allows a user or operator to configure the AFUs by providing a development environment, AFU simulation/emulation environments, libraries, drivers, APIs, etc. to aid in the development of acceleration programs using a suitable high level programming language such as hardware description language (HDL), register-transfer logic (RTL), very high speed integrated circuit (VHSIC) HDL (VHDL), Verilog, System Verilog, and the like. The AFU engine/utility compiles the developed acceleration programs into the loadable accelerator images, and provisions the loadable accelerator images into the AFUs. The provisioning may include loading the loadable accelerator images being loaded into the memory cells of a hardware accelerator 312. As an example, the AFU engine/development environment may be the Intel® Open Programmable Acceleration Engine (OPAE), Intel® AFU Simulation Environment (ASE), Intel® Quartus® Prime, Vivado® Design Suite provided by Xilinx®, Inc., or the like.

Figure 4:
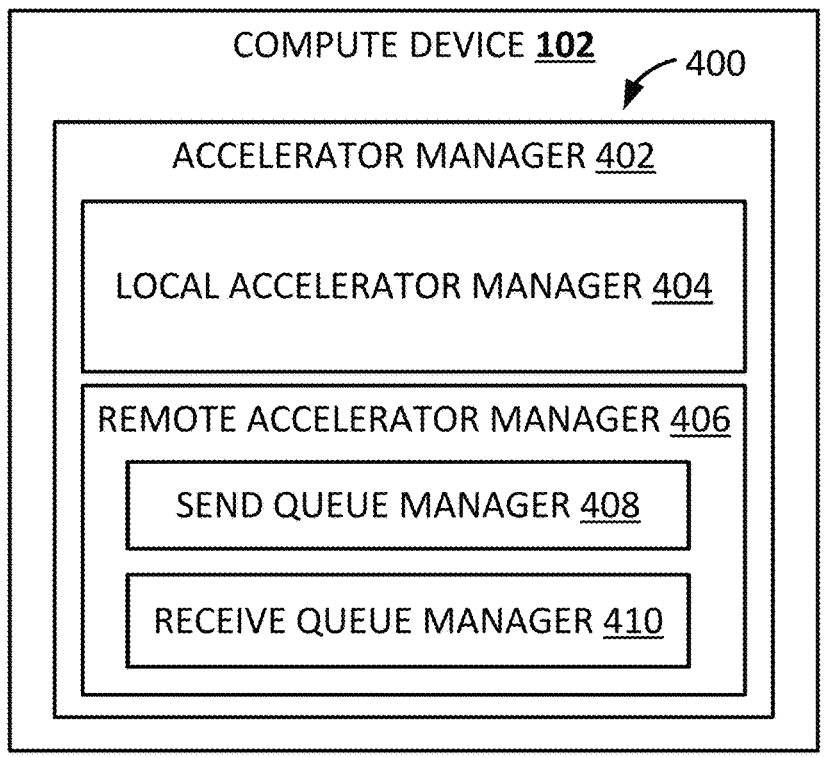
FIG. 4 illustrates an example environment that may be established by a compute device according to various embodiments.

Referring now to FIG. 4, in use, the computing platform 102 may establish an environment 400. The illustrative environment 400 includes an accelerator manager 402, which includes a local accelerator manager 404 and a remote accelerator manager 406. The various components of the environment 400 may be embodied as hardware, firmware, software, or a combination thereof. As such, in some embodiments, one or more of the components of the environment 400 may be embodied as circuitry or collection of electrical devices (e.g., an accelerator manager circuit 402, a local accelerator manager circuit 404 and/or a remote accelerator manager circuit 406, etc.). It should be appreciated that, in such embodiments the accelerator manager circuit 402, the local accelerator manager circuit 404, and/or the remote accelerator manager circuit 406, etc., may form a portion of one or more of the processor 202, the I/O subsystem 206, the host fabric interface 210, and/or other components of the computing platform 102. Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the processor 202 or other components of the computing platform 102.

The accelerator manager 402 is configured to manage accelerators that an application executed by the processor 202 may interface with. In some embodiments, the accelerator manager 402 may implement an application programming interface for accessing an accelerator, such as the OpenCL Specification published by the Khronos OpenCL Working Group on Nov. 11, 2015. The accelerator manager 402 may interface with an application in such a manner that it is transparent or otherwise unknown to the application where the accelerator is physical located; that is, it is transparent or unknown to the application whether the used accelerator is a local hardware accelerator 212 or a remote hardware accelerator 312. For example, in some embodiments, the same application may be executed on a first computing platform 102 with an accelerator manager 402 which facilitates an interface with a local hardware accelerator 212 and on a second computing platform 102 with an acceleration manager 402 which facilitates an interface with a remote hardware accelerator 312 without any changes in how the application interacts with the accelerator manager 402 of the first computing platform 102 and the accelerator manager 402 of the second computing platform 102. In another example, in some embodiments, an application may interact with an accelerator manager 402 of a computing platform 102 a first time and a second time. In such an example, for the first interaction, the accelerator manager 402 may facilitate an interface with a local hardware accelerator 212 and, for the second interaction, the accelerator manager 402 may facilitate an interface with a remote hardware accelerator 312, without any change or requirements in how the application interacts with the accelerator manager 402 between the first interaction and the second interaction. The accelerator manager 402 may select a local hardware accelerator 212 or a remote hardware accelerator 312 based on any number of factors, such as the physical presence or absence of the local hardware accelerator 212 and/or the remote hardware accelerator 312, a present usage of the local hardware accelerator 212 and/or the remote hardware accelerator 312, a configuration setting of the accelerator manager 402 that may be set by an administrator of the arrangement 100, etc.

The local accelerator manager 404 is configured to manage the hardware accelerator 212 of the computing platform 102. The local accelerator manager 404 may be implemented with use of a device driver or other software or firmware to interface with the hardware, firmware, or software of the hardware accelerator 212. The local accelerator manager 404 may facilitate the necessary functionality for interacting with the hardware accelerator 212, such as reading data from the hardware accelerator 212, writing data to the hardware accelerator 212, sending commands to the hardware accelerator 212, getting and setting properties of the hardware accelerator 212, receiving and processing events or notifications from the hardware accelerator 212 (such as processing an interrupt or setting a semaphore), etc.

The remote accelerator manager 406 is configured to provide an interface for an application executed by the computing platform 102 to a hardware accelerator 312 on an accelerator sled 104. The remote accelerator manager 406 may communicate through the host fabric interface 210 of the computing platform 102 with the host fabric interface 310 of the accelerator sled 104 using any suitable protocol or technique, such as TCP, RDMA, RoCE, RoCEv2, iWARP, etc. The remote accelerator manager 406 may facilitate the operations necessary to interface with the hardware accelerator 312, such as reading data from the hardware accelerator 312, writing data to the hardware accelerator 312, sending commands to the hardware accelerator 312, getting and setting properties of the hardware accelerator 312, receiving and processing events or notifications from the hardware accelerator 312 (such as processing an interrupt or setting a semaphore), etc. In the illustrative embodiment, the remote accelerator manager 406 may send and receive messages such as commands and data to and from the hardware accelerator 312 with use of message capsules, which include a command header portion and a data portion. The command header portion may include commands such as a read or write, a memory location, an instruction to load a program into the hardware accelerator 312, an instruction to execute a program by the hardware accelerator 312, an indication of the source computing platform 102 or source processor 202, an indication of the target hardware accelerator 312, etc. The data portion may include the data to be written or data that has been read, a program to be loaded into the hardware accelerator 312, etc. In some embodiments, the data portion may be embodied as a scatter-gather list (SGL), which may be used, for example, with RDMA to transport RDMA keys and leverage RDMA read/write for direct data transfer.

In the illustrative embodiment, the remote accelerator manager 406 may employ a send queue and a receive queue to send and receive commands such as the message capsules to and from the accelerator sled 104. Illustratively, each queue operates as a first-in first-out data structure to buffer commands that are to be sent to and are received from the accelerator sled 104. To that end, the remote accelerator manager 406 may include a send queue manager 408 and a receive queue manager 410. The send queue manager 408 is configured to manage the send queue. The send queue manager 408 may accept new commands from an application being executed on the computing platform 102 through the accelerator manager 402 and send the commands using the host fabric interface 210 to the accelerator sled 104. In the illustrative embodiment, the send queue manager 408 may maintain a separate control path queue and a data path queue. The control path queue may be used for control path functionality, such as discovering the hardware accelerators 312, querying the capabilities of the hardware accelerators 312, initializing a connection to the hardware accelerators 312, providing credentials to the hardware accelerators 312, etc. The data path queue may be used for data path functionality, such as readings and writing data and providing a program to be executed. In some embodiments, the send queue manager 408 may maintain several control path queues and/or data path queues. For example, the send queue manager 408 may maintain a separate control path queue for each processor 202 of the computing platform 102. Additionally or alternatively, the send queue manager 408 may maintain a separate data path queues for different size jobs, such as a low-latency data path queue or a bulk data path queue. The send queue manager 408 may send jobs that are associated with a small amount of data and/or a short execution time to the low-latency data path queue and send jobs that are associated with a large amount of data and/or a long execution time to the bulk data path queue. In some embodiments, the send queue manager 408 may receive as part of the command an indication which queue should be used. For example, an application may provide an indication that the low-latency data path queue should be used for a command that is time-sensitive and may provide an indication that the bulk data path queue should be used for a command that is not time-sensitive.

The receive queue manager 410 is configured to manage the receive queue. Similar to the send queue manager 408, the receive queue manager 410 may maintain several separate queues, such as one or more control path queues and/or one or more data path queues.

It should be appreciated that, in some embodiments, some of the send queues and/or receive queues may be maintained and processed by hardware (i.e., by specialized hardware configured to perform certain instructions faster or more efficiently than a general purpose processor) and other queues of the send and/or receive queues may be maintained and processed by software (i.e., with a general purpose processor and memory). In the illustrative embodiment, each of the send and receive queues of the computing platform 102 are maintained and processed by software.

Figure 5:
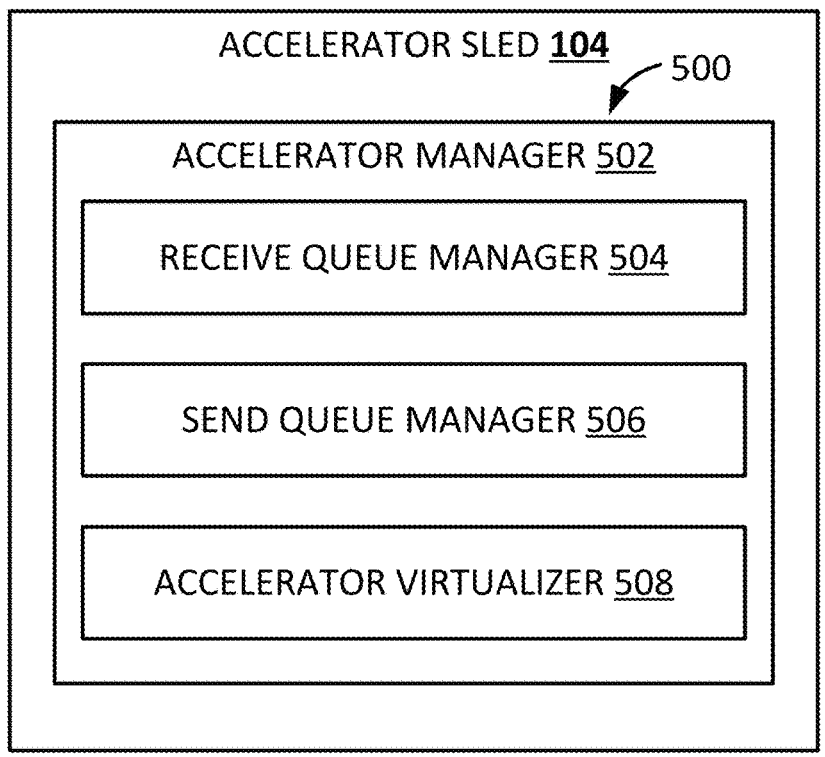
FIG. 5 illustrates an example environment that may be established by a hardware accelerator according to various embodiments.

Referring now to FIG. 5, in use, the accelerator sled 104 may establish an environment 500. The illustrative environment 500 includes an accelerator manager 502, which includes a receive queue manager 504, a send queue manager 506, and an accelerator virtualizer 508. The various components of the environment 500 may be embodied as hardware, firmware, software, or a combination thereof. As such, in some embodiments, one or more of the components of the environment 500 may be embodied as circuitry or collection of electrical devices (e.g., an accelerator manager circuit 502, a receive queue manager circuit 504, a send queue manager circuit 506, and/or an accelerator virtualizer circuit 508, etc.). It should be appreciated that, in such embodiments the accelerator manager circuit 502, the receive queue manager circuit 504, the send queue manager circuit 506, and/or the accelerator virtualizer circuit 508, may form a portion of one or more of the processor 302, the I/O subsystem 306, the host fabric interface 310, and/or other components of the accelerator sled 104. Additionally, in some embodiments, one or more of the illustrative components may form a portion of another component and/or one or more of the illustrative components may be independent of one another. Further, in some embodiments, one or more of the components of the environment 500 may be embodied as virtualized hardware components or emulated architecture, which may be established and maintained by the processor 302 or other components of the accelerator sled 104.

The accelerator manager 502 is configured to manage the hardware accelerators 312 on the accelerator sled 104 and to allow remote interfacing with the hardware accelerators 312 through the host fabric interface 310. The accelerator manager 502 may process message capsules received from and sent to the computing platform 102 and may, based on the content of the message capsules, execute the relevant necessary operations to interface with the hardware accelerators 312, such as reading data from the hardware accelerator 312, writing data to the hardware accelerator 312, executing commands on the hardware accelerator 312, getting and setting properties of the hardware accelerator 312, receiving and processing events or notifications from the acceleration device 312 (such as sending a message capsule to send an interrupt or set a semaphore on the computing platform 102), etc. The accelerator manager 502 may communicate through the host fabric interface 310 with the host fabric interface 210 on the computing platform 102 using any suitable protocol, such as TCP, RDMA, RoCE, RoCEv1, RoCEv2, iWARP, etc. The description of the message capsules used by the accelerator manager 502 is the same as for the remote accelerator manager 406, and will not be repeated in the interest of clarity.

Similar to the send queue manage 408 and the receive queue manager 410 of the accelerator manager 402 of the compute device, 102, each of the receive queue manager 504 and the send queue manager 506 manages a queue which operates as a first-in first-out data structure to buffer commands that are to be sent to and are received from the computing platform 102. The receive queue manager 504 is configured to manage the receive queue. The receive queue manager 504 may receive messages from the computing platform 102 over the host fabric interface 210 and pass the messages to the accelerator manager 502 and/or the hardware accelerator 312 for processing. In the illustrative embodiment, the receive queue manager 504 may maintain a separate control path queue and a data path queue. The control path queue may be used for control path functionality, such as receiving discovery requests of the hardware accelerators 312, receiving queries of the capabilities of the hardware accelerators 312, processing initialization of a connection with the hardware accelerators 312, receiving credentials from the computing platform 102, etc. The data path queue may be used for data path functionality, such as receiving read and write requests and receiving a program to be executed. In some embodiments, the receive queue manager 408 may maintain several control path queues and/or data path queues. For example, the receive queue manager 408 may maintain a separate control path queue for each hardware accelerator 312. Additionally or alternatively, the receive queue manager 408 may maintain a separate data path queues for different size jobs, such as a low-latency data path queue or a bulk data path queue. It should be appreciated that, in some embodiments, the accelerator sled 104 may process messages received in the receive queue asynchronously. For example, the accelerator sled 104 may complete processing a first message received in the receive queue that can be processed quickly, such as writing a small amount of data before completing processing of a second message received in the receive queue before the first message that may take longer to process, such as by executing a command on a hardware accelerator 312 which takes a long time to be executed. As another example, the receive queue manager 408 may, in some embodiments, begin processing messages received in the queue out of order.

The send queue manager 410 is configured to manage the send queue. Similar to the receive queue manager 408, the send queue manager 410 may maintain several separate queues, such as one or more control path queues and/or one or more data path queues. The send queue manager is configured to receive messages from the accelerator manager 502 and/or the hardware accelerators 312 and send the messages to the computing platform 102.

It should be appreciated that, in some embodiments, some of the send queues and/or receive queues may be maintained and processed by hardware (i.e., by specialized hardware configured to perform certain instructions faster or more efficiently than a general purpose processor) and others of the send and/or receive queues may be maintained and processed by software (i.e., with a general purpose processor and memory). In the illustrative embodiment, the receive control path queue is maintained and processed by software while the receive data path queue is maintained and processed by hardware.

The accelerator virtualizer 508 is configured to present one physical hardware accelerator 312 as two or more virtual hardware accelerators 312. The accelerator virtualizer 508 may allow for two computing platforms 102 or two processors 202 or threads on the same computing platform 102 to access the same hardware accelerator 312 without any configuration necessary on the part of the computing platform 102. For example, the accelerator manager 502 may send an indication to a computing platform 102 that the accelerator sled 104 has two hardware accelerators 312 available, which are in fact two virtual hardware accelerator 312 that correspond to one physical hardware accelerator 312. The computing platform 102 may provide messages to each of the two virtual hardware accelerators 312, which are processed by the physical hardware accelerator 312 in such a way as to provide the same response as if the commands were being processed on two physical accelerators 312 (although the messages may be processed more slowly as compared to two physical accelerators 312). To do so, the accelerator virtualizer 508 may employ virtualization techniques such as context switching and/or device partitioning.

Figure 6:
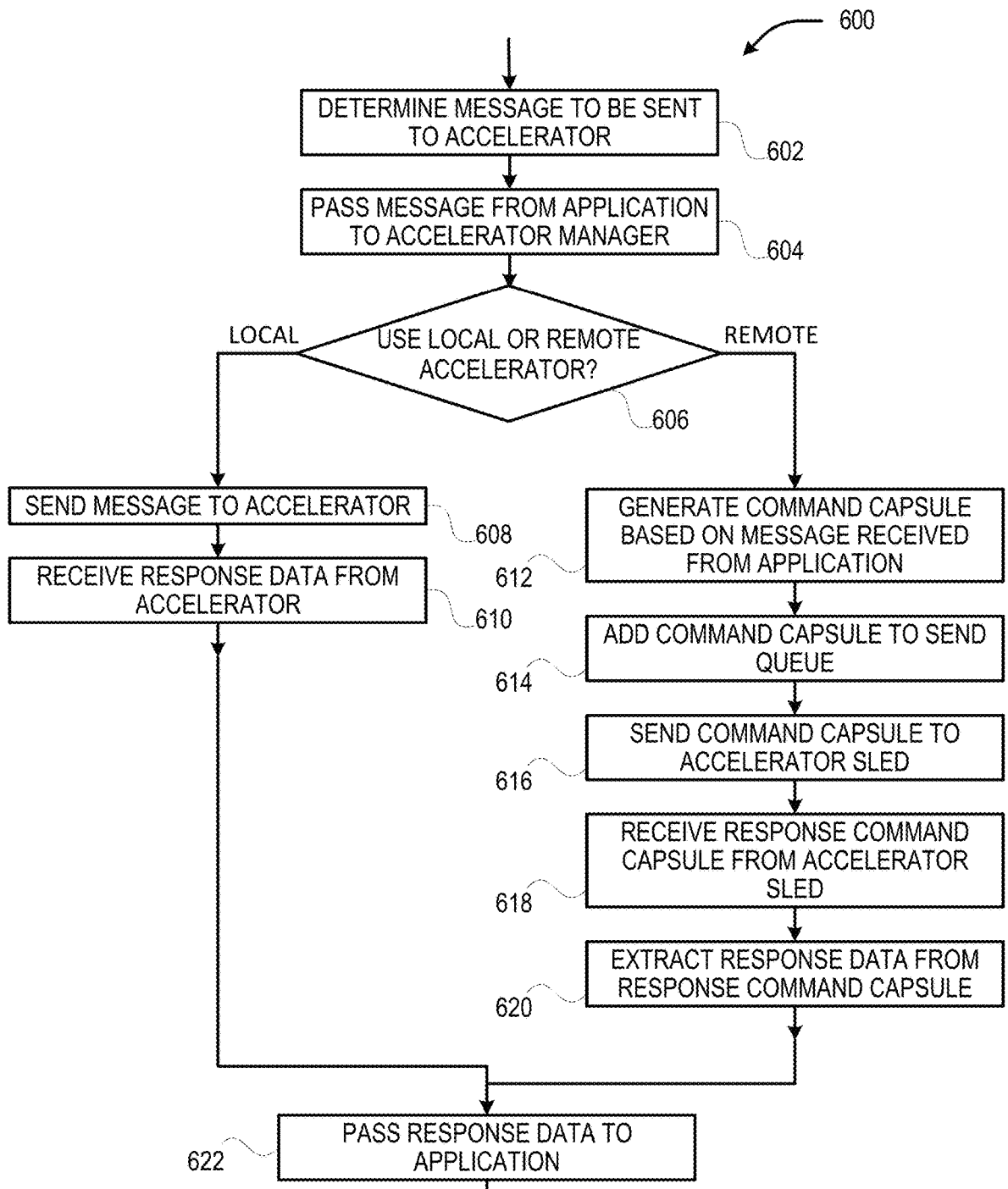
FIG. 6 illustrates an example procedure for sending an accelerator command to an accelerator sled according to various embodiments.

Referring now to FIG. 6, in use, the computing platform 102 may execute a process 600 for sending an accelerator message to a hardware accelerator 212 or 312. The process 600 begins at operation 602, in which an application on the computing platform 102 determines a message to be sent to a hardware accelerator 212 or 312. The message may be embodied as an instruction to read or write data, a command to execute a certain function, an instruction to get or set a setting on an accelerator, a control command such as a query regarding the capability of an accelerator queue, and/or any other suitable message. At operation 604, the application passes the command or function to the accelerator manager 402. In the illustrative embodiment, the application passes the command or function with use of an application programming interface such that the details of communication with the hardware accelerator 212 or 312 are hidden from the associated application.

At operation 606, if the accelerator manager 402 is to pass the message to a local hardware accelerator 212, the process 600 proceeds to operation 608, in which the accelerator manager 402 passes the message to the local hardware accelerator 212. The accelerator manager 402 may pass the message to the hardware accelerator 212 in any suitable manner, such as by sending the message over a bus such as a PCIe bus, a QuickPath interconnect (QPI), a HyperTransport interconnect, etc. The accelerator manager 402 may select a local hardware accelerator 212 or a remote hardware accelerator 312 based on any number of factors, such as the physical presence or absence of the local hardware accelerator 212 and/or the remote hardware accelerator 312, a present usage of the local hardware accelerator 212 and/or the remote hardware accelerator 312, a configuration setting of the accelerator manager 402 that may be set by an administrator of the arrangement 100, etc.

At operation 610, the accelerator manager 402 of the computing platform 102 receives response data from the hardware accelerator 212. It should be appreciated that, in some embodiments, certain messages may not warrant a response. For example, an instruction to write certain data to a certain location may not require a response. However, certain other messages may warrant a response, such as an instruction to execute a certain command, in which case the response data may be an output calculated by executing the command. The process 600 then proceeds to operation 622, in which the accelerator manager 402 passes the response data to the application. The accelerator manager 402 may pass the response data to the application in any suitable way, such as by triggering an interrupt or setting a semaphore in a memory location.

Referring back to operation 606, if the accelerator manager 402 is to pass the message to a remote hardware accelerator 312, the process 600 proceeds to operation 612, in which the computing platform 102 generates a command capsule based on the message received from the application. The command capsule may contain a command header portion, which may contain information such as the type of command to be executed, and a data portion, which may contain data such as parameters to be used when executed the command. The command capsule may augment the received message with metadata, such as an indication of the requesting computing platform 102 or the requesting processor 202, and/or the command capsule may rearrange or otherwise reorganize the message in preparation for being sent to the accelerator sled 104. In some embodiments, the command capsule may encapsulate the message in a protocol different from a protocol used by the message.

At operation 614, the computing platform 102 adds the command capsule to the send queue. In some embodiments, the computing platform 102 may determine the appropriate queue to send the command capsule to, such as a control queue if the message is a control command, a low-latency data queue if the message is a low-latency command, or a bulk data queue if the message is a bulk message such as a message with a large amount of data. The computing platform 102 may send commands that are associated with a small amount of data and/or a short execution time to the low-latency data path queue and send commands that are associated with a large amount of data and/or a long execution time to the bulk data path queue. In some embodiments, the command may include an indication which queue should be used. At operation 616, the computing platform 102 sends the command capsule to the accelerator sled 104. The computing platform 102 may use any suitable communication protocol, such as TCP, RDMA, RoCE, RoCEv1, RoCEv2, iWARP, etc.

At operation 618, the computing platform 102 receives a response command capsule from the accelerator sled 104 after the accelerator sled 104 has processed the message contained in the command capsule. It should be appreciated that, in some embodiments, certain messages may not warrant a response. For example, an instruction to write certain data to a certain location may not require a response. However, certain other messages may warrant a response, such as an instruction to execute a certain command, in which case the response data may be an output calculated by executing the command.

At operation 620, the computing platform 102 extracts response data from the response command capsule. The process 600 then proceeds to operation 622, in which the accelerator manager 402 passes the response data to the application.

Figure 7:
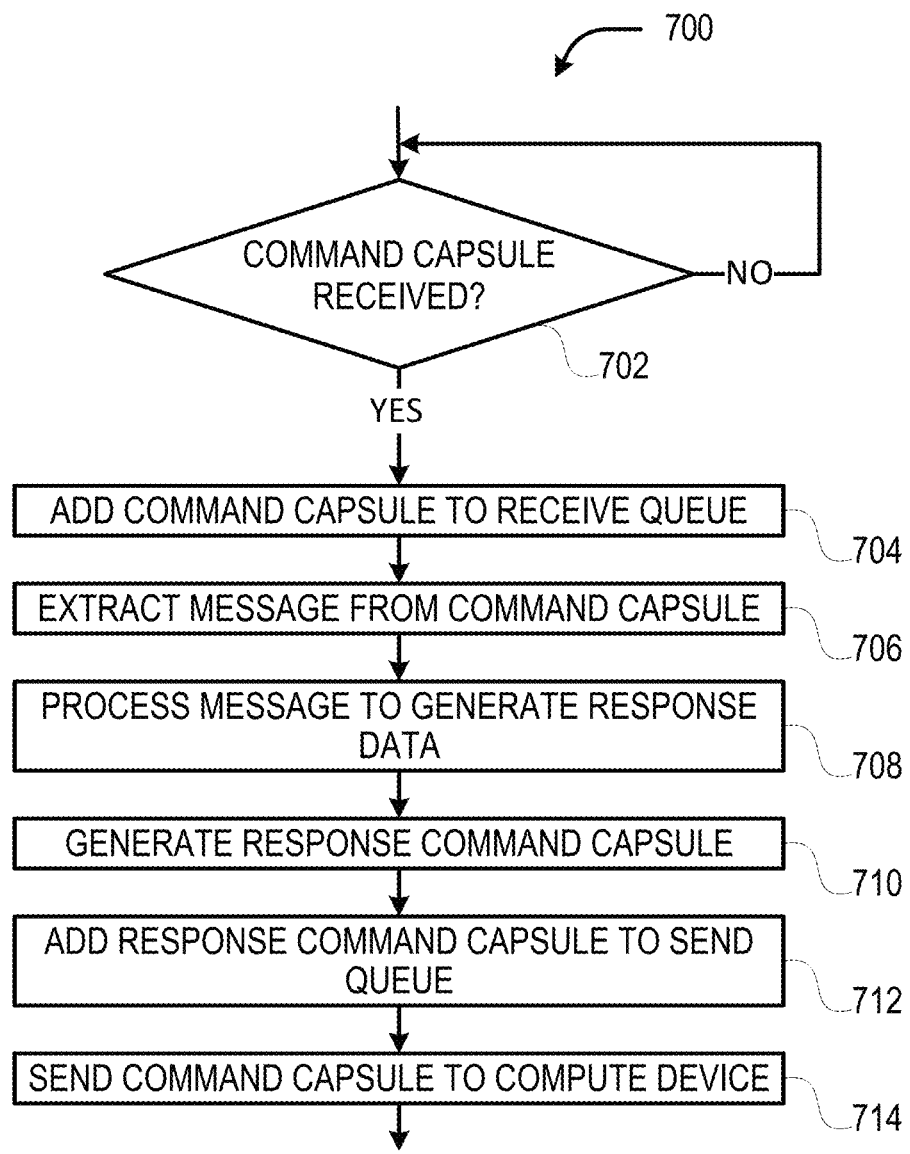
FIG. 7 illustrates an example procedure for receiving and executing an accelerator command according to various embodiments.

Referring now to FIG. 7, in use, the accelerator sled 104 may execute a method 700 for receiving and processing a command capsule from a computing platform 102. The method 700 begins at operation 702, in which, if the accelerator sled 104 has not received a command capsule, the method 700 loops back to operation 702 to wait for a command capsule. Otherwise, if the accelerator sled 104 has received a command capsule, the method 700 proceeds to operation 704, in which the accelerator sled 104 adds the received command capsule to a receive queue. In some embodiments, the accelerator sled 104 may maintain several receive queues, such as a control receive queue and a data receive queue. The control receive queue may be used for control commands such as initializing a connection with a hardware accelerator 312, querying the capability of a hardware accelerator 312, providing credentials to access a hardware accelerator 312, etc. The data receive queue may be used for messages relating to directly accessing the hardware accelerator 312, such as reading or writing data, instructing the hardware accelerator 312 to execute a certain program, etc. The various queues of the hardware accelerator 312 may in some embodiments by processed in software (i.e., with a general purpose processor and memory), hardware (i.e., in specialized hardware configured to perform certain instructions faster or more efficiently than a general purpose processor), and/or a combination of software and hardware. In the illustrative embodiment, the control receive queue may be processed in software while the data receive queue may be processed in hardware. Additionally or alternative, the accelerator sled 104 may include several data receive queues, such as a low-latency receive queue for messages which should be processed quickly and a bulk data receive queue for messages which may contain a large amount of data or can be processed when resources are available. The accelerator sled 104 may include receive queues associated with different hardware accelerators 312 and may assign a message to a particular receive queue based on the target hardware accelerator 312.

At operation 706, the accelerator sled 104 removes the command capsule from the receive queue in which it was placed and extracts the message from the command capsule. As part of extracting the message from the command capsule, the accelerator sled 104 may, for example, remove protocol headers and overhead from the command capsule to arrive at the original message. At operation 708, the accelerator sled 104 processes the message. The accelerator sled 104 may process the message by reading or writing data to or from a hardware accelerator 312, passing a command to a hardware accelerator 312, determining a response to a control command such as a query for information related to the hardware accelerator 312, etc. The accelerator sled 104 generates response data after processing the message. It should be appreciated that, in some embodiments, certain messages may not warrant a response. For example, an instruction to write certain data to a certain location may not require a response. However, certain other messages may warrant a response, such as an instruction to execute a certain command, in which case accelerator sled 104 may generate the response data by executing the command and receiving and output result. In some embodiments, the accelerator sled 104 may configure a single physical hardware accelerator 312 to appear as two or more virtual hardware accelerators 312. In such embodiments, the accelerator sled 104 may perform certain virtualization tasks such as context switching and/or device partitioning in order to process the message. It should be appreciated that, in some embodiments, the accelerator sled 104 may process messages received in the receive queue asynchronously. For example, the accelerator sled 104 may complete processing a first message received in the receive queue that can be processed quickly, such as writing a small amount of data before completing processing of a second message received in the receive queue before the first message that may take longer to process, such as by executing a command on a hardware accelerator 312 which takes a long time to be executed. As another example, the accelerator sled 104 may, in some embodiments, begin processing messages received in the queue out of order.

At operation 710, the accelerator sled 104 generates a response command capsule including the result data. At operation 712, the accelerator sled 104 adds the response command capsule to the send queue. The accelerator sled 104 may include several send queues, similar to the several receive queues (e.g., a control path send queue, a data path queue, different sets of queues for different hardware accelerators 312, etc.). In the illustrative embodiment, the control path send queue is implemented in software and the data path queue is implemented in hardware. At operation 714, the accelerator sled 104 sends the command capsule to the computing platform 102.

II. PROTOCOL MULTIPATHING EMBODIMENTS

As mentioned previously, individual hardware accelerators 312 may be decoupled from a host computing platform 102 and pooled together, for example, in an accelerator sled 104, such that individual hardware accelerators 312 can be used by applications running on a multitude of host computing platforms 102. In these embodiments, the individual hardware accelerators 312 and/or accelerator sleds 104 are communicatively coupled with the computing platforms 102 over a network fabric (e.g., network 106). This allows the computing platforms 102 to attach to the hardware accelerators 312 so that applications or virtual machines (VMs) running on the computing platforms 102 can use the hardware accelerators 312 regardless of the location of the hardware accelerators 312 or the computing platforms 102 in the data center. In this way, applications running on any computing platform 102 can have access to the pool of accelerators, which results in better utilization of accelerator resources within the data center.

When implementing hardware accelerators 312 in a pooled system (e.g., one or more of the accelerator sleds 104 discussed previously), multiple transport protocols (e.g. TCP, UDP, RoCEv1, RoCEv2, iWARP, PSM, etc.) may be used to make the pooled hardware accelerators 312 accessible to computing platforms 102 over the network fabric 106. Different transport protocols have different positive and negative aspects, and tradeoffs may have to be evaluated in selecting a particular transport protocol. The choice of network transport protocol used in the communication between a computing platform 102 and remote accelerator sled 104 may affect the performance of the applications hosted by the computing platform 102 and/or the hardware accelerator 312 being used. For example, some data center operators may choose to implement the RDMA protocol because RDMA allows a host adapter in the host fabric interface 210 of a computing platform 102 to know when a packet has arrived over the network 106, the application that should receive the packet for processing, and a location in the application's memory space where the packet should be stored. Instead of sending the packet to the host operating system kernel or VMM/hypervisor to be processed and then copied into the application memory space, which is the case for Internet Protocol (IP) networking applications, RDMA places the contents of the packet directly in the application's memory space (e.g., a buffer) without further interventions. In another example, a data center operator may choose to use TCP, even though TCP requires additional networking and computational overhead when compared with RDMA, because it is easier to migrate VMs and applications between multiple physical computing platforms 102 using TCP. Various factors may influence the choice of protocol to be used, and in many cases, the network fabric 106 and protocol resulting in the best performance with lowest cost is selected for use.

In embodiments, a network attached hardware accelerator 312 enables an application or VM to migrate from a first (source) computing platform 102 to a second (destination) computing platform 102 while continuing to use the hardware accelerator 312 uninterrupted. However, when using certain transport protocols for communication, such as an RDMA-based protocols, migrating the application or VM is challenging since the connection state of the RDMA connection is located in the host fabric interface 210 of the source computing platform 102, which does not migrate with the application or VM to the destination computing platform 102. A similar problem arises when a link failure between the application/VM and the a hardware accelerator 312 takes place during an RDMA-based connection, as it may be difficult to re-establish the connection since the RDMA connection is located in the host fabric interface 210 of the source computing platform 102. Other transport protocols, such a TCP, handle application/VM migration and link failure recovery better than RDMA-based protocols. However, RDMA-based transport protocols tend to perform better than TCP.

The present disclosure provides accelerator fabric multipathing embodiments in order to address the aforementioned issues. In these embodiments, a computing platform 102 establishes a communication session with a target hardware accelerator 312, and the communication session includes multiple (at least two) physical paths (or "connections") through which network traffic is to travel. In various embodiments, a primary path of the multiple paths or connections is used for transferring data between the computing platform 102 and the hardware accelerator 312, and a secondary path or connection is used for migration, load balancing, and link management purposes. Additionally, one or more secondary paths or connections may be used for load balancing or to achieve a certain level of redundancy required by the application domain. In some embodiments, the path or connection with the most efficient network performance is selected to be the primary connection. The network efficiency may be expressed in terms of performance (e.g., latency or throughput), resource usage or utilization (e.g., signaling, memory/storage, and/or computational overhead), and/or a ratio of performance versus resource utilization. Other metrics may be used for selecting primary and secondary connections in other embodiments. In any of the aforementioned embodiments, an entity, referred to as an "initiator," is used to abstract and aggregate the multiple paths into a single communication session, and controls whether the computing platform 102 should fall back on a secondary path when the primary path is unavailable.

In various embodiments, each of the paths or connections use different network transport protocols to achieve high-availability goals in different scenarios, such as when one transport protocol is temporarily unusable even though the physical path is still available. This is especially relevant for use with accelerator sleds 104 where the host computing platform 102 typically utilizes a target hardware accelerator 312 for offloading some portion of a computational workload. In these cases, even a temporary loss of connectivity with the target hardware accelerator 312 will cause stoppage of the offloaded computation, and requiring the acceleration results to be discarded and necessitating the computation to be restarted when the connection is re-established. This results in degraded performance and inability to meet service level agreements (SLA) and/or service level objectives (SLO). The accelerator fabric multipathing embodiments allow the accelerator fabrics to be more robust and highly available for offloading of computational workloads, and also allow the offloaded workloads to be performed uninterrupted even when network connectivity is lost between a host computing platform 102 and a hardware accelerator 312 and/or during VM migration. The accelerator fabric multipathing embodiments are useful for hyper-scale environments with multiple network paths that are prone to transient errors. These and other embodiments are discussed in more detail with respect to FIG. 8.

Figure 8:
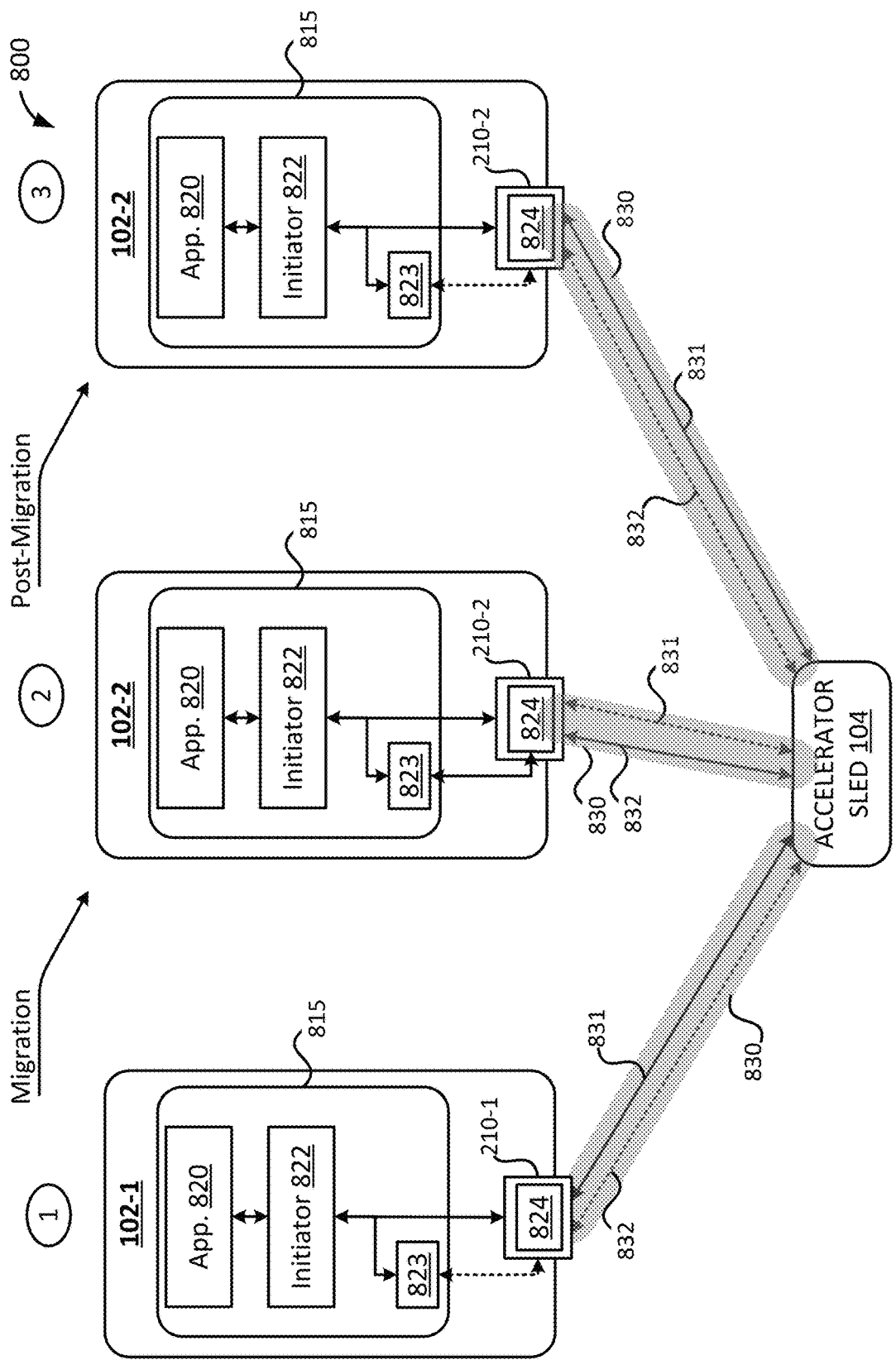
FIG. 8 illustrates an example accelerator fabric multipathing environment according to various embodiments.

Referring now to FIG. 8, which shows an example accelerator fabric multipathing environment 800, according to various embodiments. The environment 800 includes a source computing platform 102-1 and a destination computing platform 102-2, both of which have the same or similar components as shown and as discussed previously. In various embodiments, the arrangement 800 is a cloud computing environment. In cloud computing environments, applications (e.g., application 820) are typically deployed within one or more virtual machines (e.g., VM 815) or application container operating on the physical hardware of one or more computing platforms 102. Using VMs and/or application containers provides scalability, flexibility, manageability, and utilization, which results in lower operating or overhead costs at least in terms of computing, storage, and network resource usage. Many situations may arise where VMs and/or application containers need to be relocated or migrated from one physical machine to another. In the illustrated example, the source computing platform 102-1 operates a virtual machine (VM) 815 at node 1, which is then migrated to the destination computing platform 102-2 at nodes 2 and 3. Although FIG. 8 shows an example where a VM 815 is migrated between computing platforms 102-1 and 102-2, it should be understood that application containers may also be migrated between physical machines in a same or similar manner as discussed herein.

It is usually desirable to migrate VMs between physical devices in a seamless manner, without explicit application/VM or user-level awareness, in order to avoid workload or processing stoppages. A seamless migration for VMs means that the applications/services being executed within the VMs should continue to run unhindered before, during, and after the actual migration process. For the virtual machine monitor (VMM) or hypervisor (not shown by FIG. 8), a seamless migration means that the VM state (including processor, memory, I/O, communication session, and application states) on the currently hosting (source) computing platform 102-1 be transferred to the destination computing platform 102-2 (or target computing platform 102-2) with little or no interruption. Transferring VM processor and memory states is a relatively straightforward operation, which involves copying data from the source computing platform 102-1 to the destination computing platform 102-2. This migration operation is a somewhat bandwidth intensive task, which tends to utilize a large amount or networking resources. Transferring VM I/O states is a more complex operation than that required for transferring VM processor and memory states, especially when the VM 815 has been assigned to particular hardware elements and is actively using I/O devices and functions.

Continuing with the example of FIG. 8, the VM 815 (also referred to as a "host endpoint" or the like) may operate on a type 1 hypervisor (also referred to as "bare metal," "hardware virtualization infrastructure," or the like) or may be hosted by a type 2 hypervisor (also referred to as a "virtual machine monitor" or a "host hypervisor"). Type 1 hypervisors run directly on top of the hardware of the computing platform 102, and type 2 hypervisors operate as an application on top of an existing host operating system. In the context of accelerator fabrics, such as accelerator resources provided by one or more accelerator sleds 104, the host endpoint may utilize protocols 823 and 824 to access accelerator resources provided by an accelerator pool. In the illustrated example, the accelerator pool may include the accelerator sled 104, however in other embodiments, an accelerator pool may include multiple accelerator sleds 104 and/or some other organization of hardware accelerators 312.

As mentioned earlier, in order to achieve performance and resource efficiencies, the accelerator fabric may utilize higher performance protocols, such as an RDMA-based protocol. These protocols are often implemented in the hardware of the host fabric interface 210 to realize the performance and resource efficiencies. For similar reasons, VMs are often configured to allow either direct access to the physical host fabric interface 210 (also referred to a "direct assignment") or by assigning one or more of the virtual functions (VFs) supported by the host fabric interface 210 using I/O virtualization techniques such as single-root input/output virtualization (SR-IOV) or the like.

In the example of FIG. 8, at node 1, the VM 815 is assigned to host fabric interface 210-1 and is running an application 820 that is offloading some portion of its computational workloads to a remote accelerator resource accessible over the assigned host fabric interface 210-1. As used herein, an "accelerator resource" may refer to an individual hardware accelerator 212, 312, a virtualized hardware accelerator as provided by the accelerator virtualizer 508, or a unit of work provided by one or more physical or virtualized hardware accelerators. When the VM 815 needs to be migrated from the source computing platform 102-1 to the destination computing platform 102-2, the VM processor state, the VM memory state, as well as all of the VM network and VM I/O states need to be migrated to the destination computing platform 102-2 with as little impact to any ongoing processing tasks and network traffic. The VM network states and VM I/O states are states stored on the assigned host fabric interface 210-1. One common technique to handle migration of network and I/O states is through the use of an emulated network interface card (NIC) in the VM 815. In this solution, the NIC seen by the VM 815 is actually a synthetic device whose functionality is emulated by the underlying VMM/hypervisor, where the network and I/O states are transferred by the VMM/hypervisor itself. However, when hardware functions are directly assigned to the VM 815, as is the case described above for accelerator fabrics, coordination between the NIC, the VM 815, and the destination computing platform 102-2 is usually required. Therefore, these NIC emulation techniques have increased complexity, resulting in greater computational strain on the underlying computing platform 102-1, 102-2. Additionally, these NIC emulation techniques require the involvement of the VM 815 in the migration process, which makes seamless migration extremely difficult.

According to various embodiments, protocol-level multipathing is used for seamless VM migration operations. Referring back to FIG. 8 at node 1, the source computing platform 102-1 (or the initiator 822 running within the VM 815) has established a communication session 830 with the accelerator sled 104 (or an individual hardware accelerator 312 within the accelerator sled 104 (not shown by FIG. 8)). In the illustrated embodiment, the initiator 822 is an application hosted by the VM 815, while in other embodiments, the initiator 822 resides in an application container, a host operating system kernel, or a VMM/hypervisor on which the VM 815 operates. In other embodiments, the VM 815 may be the initiator 822 or otherwise perform functions of the initiator 822 as discussed herein. In some other embodiments, the initiator 822 may be a firmware module that runs directly on a hardware element of the computing platform 102, such as the processor(s) 202 or a host bus adaptor or the like. In one example, some or all aspects of the initiator 822 may operate on a local hardware accelerator 212 of the computing platform 102-1 or 102-2.

In any of the aforementioned embodiments, the initiator 822 is analogous to a client in the client/server model, and a "target" is analogous to a server in the client/server model. For purposes of the present disclosure, the "target accelerator resource(s)" refers to the controller at the accelerator sled 104 that exposes accelerator resource(s) to the computing platforms 102 (e.g., the accelerator manager 502 of FIG. 5) or the accelerator resource(s) themselves, such as a physical hardware accelerator 312, a virtualized accelerator provided by the accelerator virtualizer 508, or workload units provided by individual hardware accelerators 312 in the accelerator sled 104.

The communication session 830 comprises a primary connection 831 and a secondary connection 832. The primary connection 831 has or utilizes the transport layer 824 and the secondary connection 831 has or utilizes the transport layer 823, wherein the transport layer 823 is different than the transport layer 824. In embodiments, the initiator 822 communicates data, on behalf of the application 820, with the target accelerator resource(s) over the primary connection 831 or the secondary connection 832.

In one example, the transport layer 823 is a TCP entity that is implemented and managed by the host VM 815, and the transport layer 824 is an RDMA-based transport layer entity, such as an RoCEv2 entity, that is implemented and managed by dedicated hardware elements of the host fabric interface 210-1. In this example, since the host fabric interface 210-1 implements the RDMA-based transport protocol layer 824, the host fabric interface 210-1 may be an RNIC and may be referred to as "RNIC 210-1" or the like. The application 820 interfaces with the target accelerator resource(s) in the accelerator sled 104 via the host VM 815 (or the initiator 822) and the RNIC 210-1. The host VM 815 (or the initiator 822) accesses the target accelerator resource(s) exported by the accelerator sled 104 over the underlying network fabric 104 using the higher performing RDMA entity 824. In FIG. 8 at node 1, the solid line of the primary connection 831 indicates that the primary connection 831 is an active connection of the session 830, and the dashed line of the secondary connection 832 indicates that the secondary connection 832 is an inactive connection of the session 830. By using the RDMA protocol layer 824, the host VM 815 utilizes RDMA kernel bypassing mechanisms to access the RNIC 210-1 directly to achieve the aforementioned performance and resource utilization efficiencies. This means that the system software or the VMM/hypervisor of the VM 815 will not be able to emulate the RNIC 210-1.

Continuing with the aforementioned example, when the VM 815 is to perform a migration operation (i.e., migrate from source computing platform 102-1 at node 1 to destination computing platform 102-2 node 2), the initiator 822 instructs the host VM 815 to stop using the RDMA protocol layer 824 for further accesses to the target accelerator resource(s), and instead to falls back to using the TCP layer 823 over an emulated host fabric interface 210-1 exported to the VM 815. In some embodiments, the initiator 822 uses the protocol stack of transport layer 824 to emulate the host fabric interface 210 during the migration process. As shown by FIG. 8 at node 2, the solid line of the secondary connection 832 indicates that the secondary connection 832 has been activated during the migration process, and the dashed line of the primary connection 831 indicates that the primary connection 831 has been deactivated for the migration process. Once the VM 815 stops using the RDMA engine in the assigned RNIC 210-1, the VMM/hypervisor can more easily shutdown the RNIC 210-1 functions and transfer the connection/network states to the destination computing platform 102-2 without having to worry about the dynamically changing state of an active connection. Likewise, since the TCP connectivity between the host VM 815 and destination computing platform 102-2 uses an emulated host fabric interface 210-1 under VMM/hypervisor control, migrating the various VM states is relatively straightforward and less computationally complex than conventional VM migration techniques.

After the VM state transfer is completed and the VM 815 is running on the destination computing platform 102-2, at node 3, the initiator 822 instructs the VM 815 to deactivate the secondary connection 832 and re-establish connectivity using the primary connection 831 (utilizing the RDMA protocol layer 824) over a newly assigned RNIC 210-2. In FIG. 8 at node 3, the solid line of the primary connection 831 indicates that the primary connection 831 has been re-activated, and the dashed line of the secondary connection 832 indicates that the secondary connection 832 has been deactivated. By switching from a high-performance, non-migratable network connection 831 to a migratable network connection 832 for the duration of the VM migration event, a seamless VM migration operation can be achieved. In addition to the migration operation, the VM 815 may also fallback to the secondary connection 832 for other reasons as determined by the initiator 822, such as when the initiator 822 detects a link failure or other like disconnection in the primary connection 831. Since both of the primary and secondary connections 831, 832 are bound to the same session 830, the initiator 822 can immediately start using the secondary connection 832 with little or no disruption to the operation of the VM 815 or the application 820.

Figure 9:
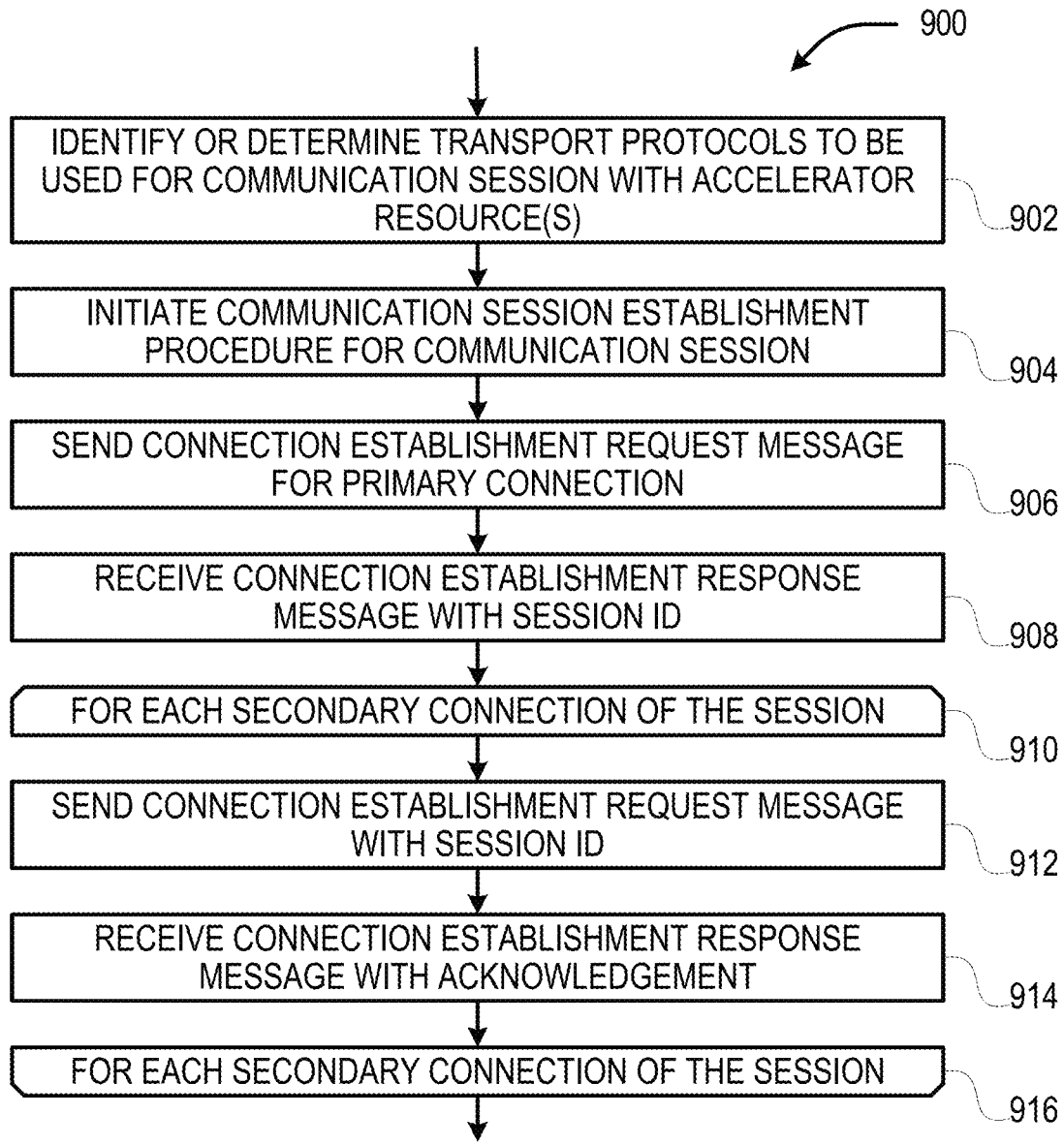
FIG. 9 illustrates an example procedure for establishing a communication session with target accelerator resource(s) in accordance with various embodiments.

Referring now to FIG. 9, which illustrates an example process 900 for establishing a communication session 830 with target accelerator resource(s), in accordance with various embodiments. In use, the initiator 822 hosted by a VM 815 of a computing platform 102 executes process 900 for establishing a communication session 830 with target accelerator resource(s) via the accelerator manager 502. However, other entities elements of the computing platform 102 may also operate process 900. Furthermore, the various messages discussed a being communicated between the initiator 822 and the accelerator resource(s) may be performed according to processes 600-700 of FIGS. 6-7, respectfully.

Process 900 begins at operation 902, in which the initiator 822 identifies or determines one or more transport protocols to be used during a communication session 830 with target accelerator resource(s). Any number of transport protocols may be used, such as those discussed herein. It should be noted that each identified or determined transport protocol will correspond with an individual connection that makes up the communication session 830. Additionally, operation 904 may involve the initiator 822 selecting or otherwise determining which transport protocol should be used for the primary connection 831, where the remaining transport protocols will be used a respective secondary connections 832. The identification and selection of the transport protocols may be based on a policy or configuration, and/or based on operating parameters of the components of the computing platform 102.

At operation 904, the initiator 822 initiates a communication session 830 establishment procedure with the target accelerator resource(s). Operation 904 may involve performing some initial operations for setting up the communication session as indicated by the identified transport protocols, such as initializing or activating any communication circuitry needed for the communication session, allocating memory space for any necessary buffers, and the like. In one example where an RDMA-based protocol is identified at operation 902, operation 904 may involve setting up an RDMA queue pair (QP) including a send queue and a receive queue in the host fabric interface 210. In another example where TCP is identified at operation 902, operation 904 may involve setting up a TCP receive window buffer and/or the like.

At operation 906, the initiator 822 generates and sends, to the target accelerator resource(s), a connection establishment request message for a primary connection 831. The connection establishment request message for the primary connection 831 may include any necessary parameters as required by the particular protocol used for the primary connection 831. For example, where an RDMA-based protocol is used for the primary connection 831, such as RoCEv2, the initiator 822 may encapsulate an RDMA transport packet within an Ethernet/IP/UDP packet (including either IPv4 or IPv6) where the destination UDP port field is set to a predefined value (e.g., 4791) and the source UDP port field is populated with a randomly generated number for the QP. In this example, intermediate switches in the arrangement 100 or environment 800 would use standard five-tuple hashing so that traffic belonging to the same QP follows the same path between destination and source nodes. In embodiments, the connection establishment request message for the primary connection 831 may also include an identifier (ID) of the initiator 822 (e.g., a suitable fingerprint value or the like), an ID of the computing platform 102 (e.g., an IP address, MAC address, source port address, and/or the like), and/or an ID for the primary connection 831.

In response to the connection establishment request message for the primary connection 831, at operation 906, the initiator 822 receives a connection establishment response message for the primary connection 831 from the target accelerator resource(s). For example, where an RDMA-based protocol is used for the primary connection 831, such as RoCEv2, the target accelerator resource(s) may encapsulate an RDMA acknowledgement (ACK) packet within an Ethernet/IP/UDP packet (including either IPv4 or IPv6) and including suitable destination and source addresses based on the connection establishment request message. In embodiments, the connection establishment response message for the primary connection 831 includes a session ID, which may be included in the header or payload section of the message. The session ID is generated by the target accelerator resource(s) and is discussed in more detail infra. Other suitable information may be included in the connection establishment response message, such as an accelerator resource identifier and/or other protocol specific information. Additionally, the initiator 822 may store the session ID and/or the other information included in the connection establishment response message in a suitable data structure or database object for later use at operations 910-916.

In embodiments where the transport protocol for the primary connection 831 is an RDMA-based protocol, the initiator 822 may instruct the host fabric interface 210 to perform operation 906 and 908. In these embodiments, the initiator 822 may pass the relevant identifiers to the host fabric interface 210 for inclusion in the connection request message for the primary connection 831, and may also obtain the session ID from the host fabric interface 210 for storage and later use.

At open loop operation 910, the initiator 822 processes each secondary connection 832 of the communication session 830, in turn. As alluded to previously, each transport protocol identified or determined at operation 902 may correspond with an individual connection that makes up the communication session 830. For example, if three transport protocols were identified at operation 904, then two secondary connections 832 may be processed at operations 910-916 since one of the three identifier transport protocols is used for the primary connection 831.

At operation 912, the initiator 822 generates and sends, to the target accelerator resource(s), a connection establishment request message for the secondary connection 832. In addition to any connection parameters defined by the particular protocol used for the secondary connection 832, the connection establishment request message for the secondary connection 832 is generated to also include the session ID provided in the message received at operation 908. In one example where TCP is used with a secondary connection 832, operations 912 and 914 may involve performing the TCP three-way handshake for connection establishment. In this example, operation 912 may involve the initiator 822 sending a TCP packet with a synchronize (SYN) bit set in the header to the target accelerator resource(s)). In another example, operation 912 may involve sending a TCP packet with an active SYN and including RDMA parameters, such as an RoCE address of the host fabric interface 210.

In response to the connection establishment request message for the secondary connection 832, at operation 914, the initiator 822 receives a connection establishment response message for the secondary connection 832 from the target accelerator resource(s). In embodiments, the connection establishment response message for the secondary connection 832 is an ACK message indicating that the secondary connection 832 has been added or otherwise associated with the communication session 830. The ACK may be any suitable flag or indicator included in the connection establishment response message for the secondary connection 832. In one example where TCP is used with a secondary connection 832, the connection establishment response message for the secondary connection 832 may be TCP packet with a SYN-ACK bit activated, which may or may not include additional RDMA parameters of the target accelerator resource(s), such as a QP number, a remote memory buffer (RMB) key, RMB indexing information, etc. In this example, the initiator 822 may also send a TCP packet with an ACK bit set back to the target accelerator resource(s)) to complete the TCP three-way handshake. Any other suitable information may be included in this connection establishment response message, such as the accelerator resource identifier and/or any other protocol specific information. Additionally, the initiator 822 may store the information included in this connection establishment response message in the aforementioned data structure or database object. At close loop operation 916, the initiator 82 proceeds back to operation 910 to process any remaining secondary connections 832, if any. Process 900 may end after all secondary connections 832 have been processed. It should be noted that, although process 900 shown by FIG. 9 shows the primary connection 831 being established before one or more secondary connections 832, in other embodiments, the order of connection establishment may be changed, for example, where one or more secondary connections 832 are established before the primary connection 831.

Figure 10:
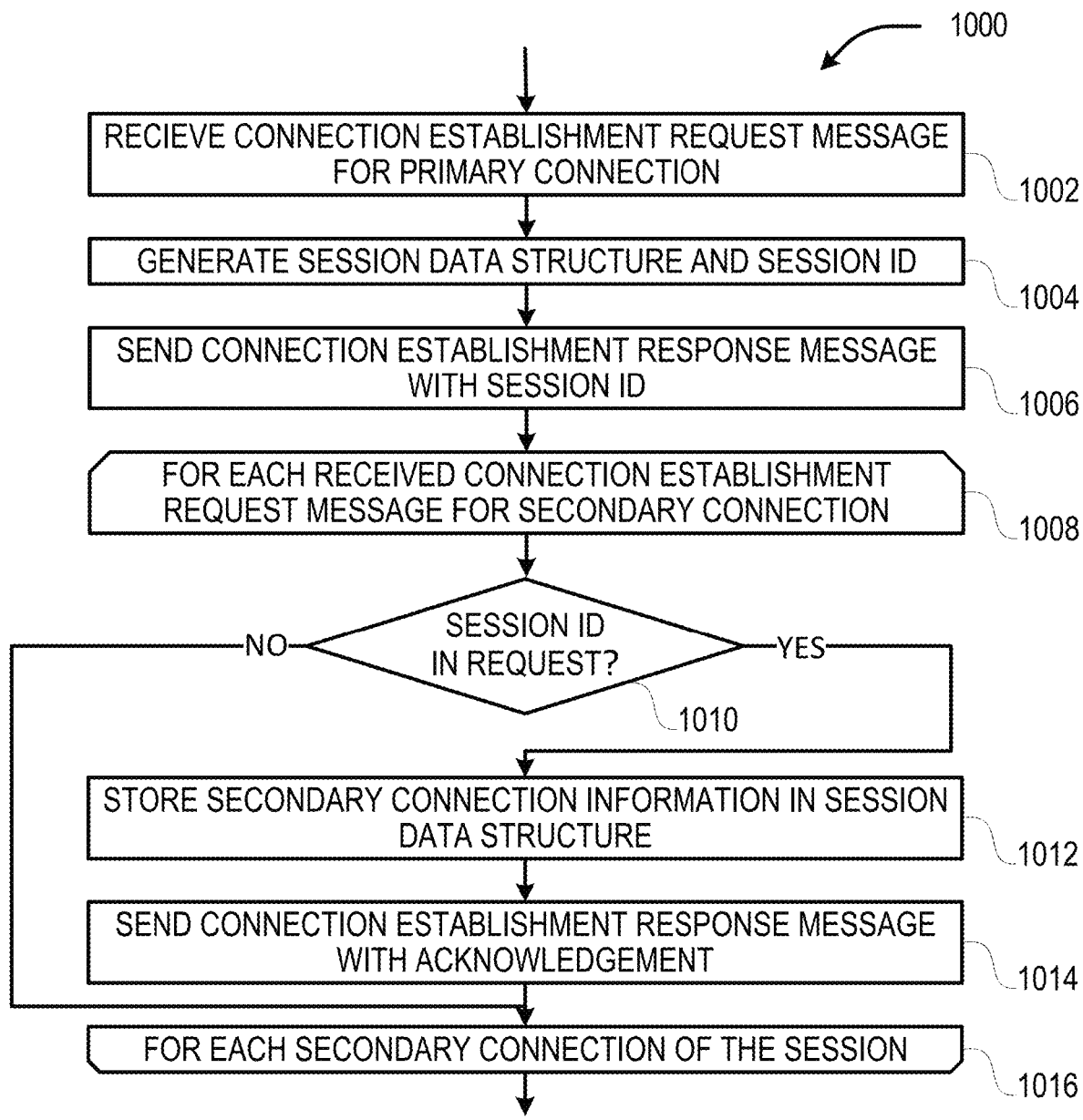
FIG. 10 illustrates an example procedure for establishing a communication session with a computing platform in accordance with various embodiments.

Referring now to FIG. 10, which illustrates an example process 1000 for establishing a communication session 830 with a computing platform 102, in accordance with various embodiments. In use, the accelerator manager 502 hosted by the accelerator sled 104 (or an individual hardware accelerator 312) executes process 1000 for establishing a communication session 830 an initiator 822 hosted by a VM 815 of a computing platform 102. However, other entities elements of the accelerator sled 104 or accelerator 312 may also operate process 1000. Furthermore, the various messages discussed a being communicated between the accelerator manager 502 and the initiator 822 may be performed according to processes 600-700 of FIGS. 6-7, respectfully.

Process 1000 begins at operation 1002, in which the accelerator manager 502 receive a connection establishment request message for a primary connection 831 from an initiator 822. The connection establishment request message for the primary connection 831 may be the same message discussed previously with respect to operation 906 of process 900. At operation 1004, the accelerator manager 502 generates a session data structure for the communication session 830, and generates a session ID for the communication session 830. The session data structure may be any suitable data element for storing information, such as a key-value pair, attribute-value pair, tuple, database object, or the like. The session ID may be generated according to known techniques, such as by using a random number generator, a hash function (which may take one of more data items from the connection establishment request message as inputs), or a combination thereof. Additionally, operation 1004 also involves storing the generated session ID in the session data structure along with any other relevant information included in the connection establishment request message for the primary connection 831.

At operation 1006, the accelerator manager 502 generates a connection establishment response message for the primary connection 831 to include the session ID, and sends the connection establishment response message for the primary connection 831 to the initiator 822. The connection establishment response message for the primary connection 831 may be the same message discussed previously with respect to operation 908 of process 900, and may include various protocol specific data/information as discussed previously.

At open loop operation 1008, the accelerator manager 502 processes each connection establishment request message for a secondary connection 832 received from the initiator 822, in turn. These messages may be the same messages discussed previously with respect to operation 912 of process 900. At operation 1010, the accelerator manager 502 determine whether the session ID is included in the connection establishment request message for the secondary connection 832. This operation may involve comparing the session ID stored in the session data structure with the session ID in the connection establishment request message. If the connection establishment request message does not include the session ID, then the accelerator manager 502 proceeds to close loop operation 1016 to process a next connection establishment request message, if any.

If at operation 1010 the accelerator manager 502 determines that the session ID in the request matches the previously generated session ID, then the accelerator manager 502 proceeds to operation 1012 to store information included in the connection establishment request message for the secondary connection 832 in association with the session ID and/or other information of the primary connection 831 already stored in the session data structure.

At operation 1014, the accelerator manager 502 generates and sends, to the initiator 822, a connection establishment response message for the secondary connection 832, which may include an ACK flag or indicator as discussed previously. At close loop operation 1016, the accelerator manager 502 proceeds back to operation 1008 to process any remaining connection establishment request messages, if any. Process 1000 may end after all secondary connection 832 connection establishment request messages have been processed. In addition to the operations discussed supra, process 1000 may also include various session establishment operations that are the same or similar to those discussed previously with respect to operation 902 of process 900.

Figure 11:
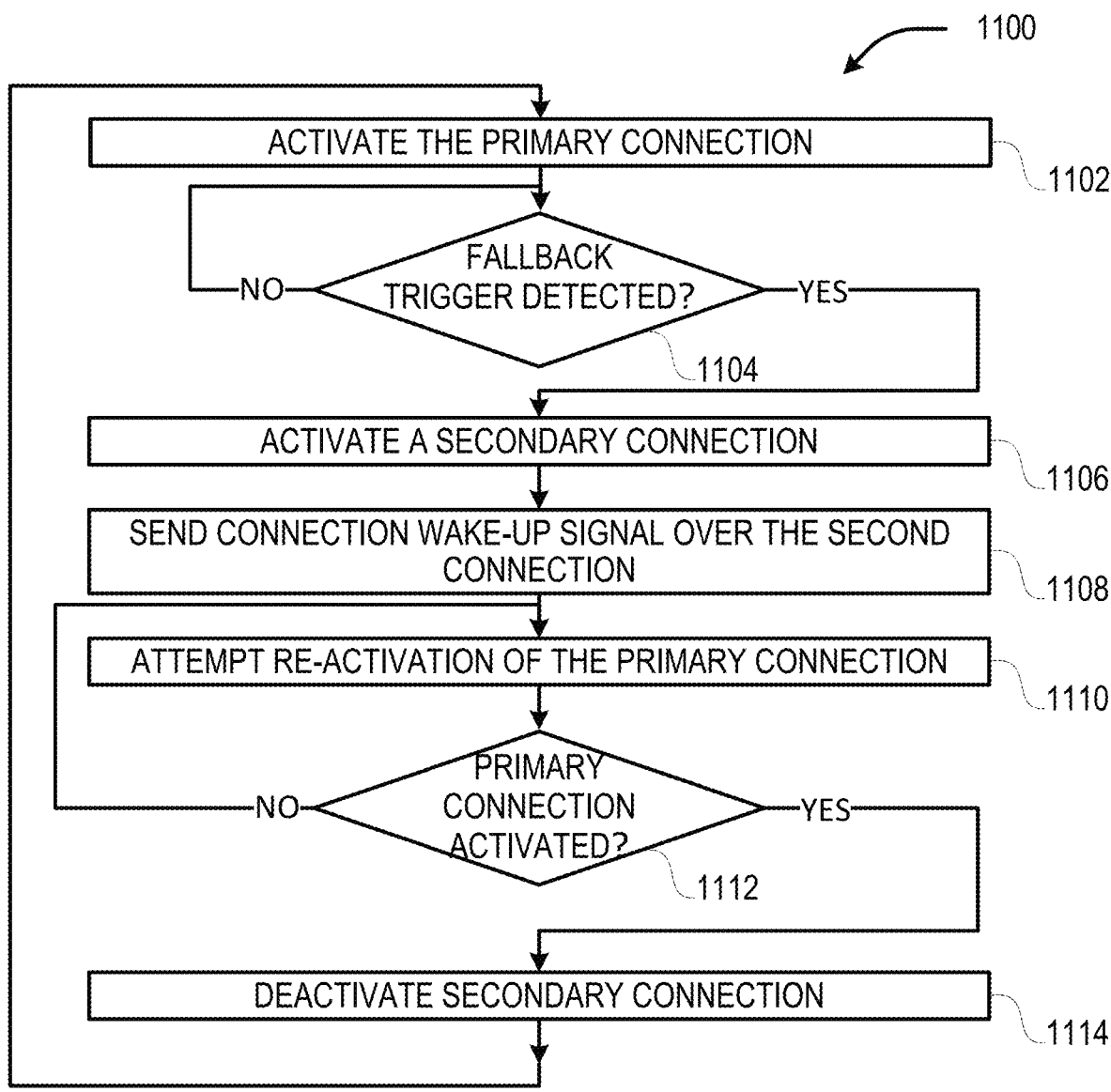
FIG. 11 illustrates an example multipath fallback procedure in accordance with various embodiments.

Referring now to FIG. 11, which illustrates an example multipath fallback process 1100, in accordance with various embodiments. In use, the initiator 822 hosted by a VM 815 of a computing platform 102 executes process 1100 for switching between connections 831, 832 of a communication session 830 with target accelerator resource(s). However, other entities elements of the computing platform 102 may also operate process 1100. Furthermore, the various messages discussed a being communicated between the initiator 822 and the accelerator resource(s) may be performed according to processes 600-700 of FIGS. 6-7, respectfully.

Process 1100 begins at operation 1102, where the initiator 822 activates the primary connection 831 of the communication session 830, and communicates data with the accelerator resource(s) according to the embodiments discussed herein. In embodiments, the primary connection 831 may be activated in response to receipt of a control or data packet from the computing platform 102 (or the initiator 822) over the primary connection 831. It should be noted that the act of sending command and/or data signaling over the primary connection 831 is supported after the session 830 has been established without needing a special activation message. Meanwhile, at operation 1104, the initiator 822 determines whether a fallback trigger has been detected. As examples, the fallback trigger may be an indication of a link failure or link disconnection, an indication or instruction to perform a migration process, or the like. In one example, the indication of the link failure or link disconnection may include detecting expiration of a timer, which may indicate that the connection has failed or "timed out." In another example where TCP is used, the indication or instruction to perform a migration process may be based on, or may include sending a TCP packet with a set FIN bit in the header of the TCP packet. In another example where an RDMA transport protocol is used, the indication or instruction to perform a migration process may be based on setting the QP to an error state, which causes a disconnect request to be sent to the target accelerator resource(s) (e.g., by calling the rdma_disconnect( ) function). The initiator 822 may monitor for the fallback trigger continuously or on a periodic basis. If the initiator 822 does not detect a fallback trigger at operation 1104, then the initiator 822 loops back to continue to monitor for the fallback trigger.

If the initiator 822 does detect a fallback trigger at operation 1104, the initiator 822 proceeds to operation 1106 to activate a secondary connection 832. In embodiments where there are multiple secondary connections 832, the initiator 822 may select one of the multiple secondary connections 832 at random or may select a secondary connection 832 according to predetermined rankings or priority levels associated with each of the secondary connections 832. In some embodiments, operation 1106 may include deactivating the primary connection 831, such as where the fallback trigger is an indication for performing a migration procedure. In these embodiments, the initiator 822 may send a deactivation message to the target accelerator resource(s) to indicate deactivation of the primary connection 822.

At operation 1108, the initiator 822 sends a connection wake-up signal to the accelerator resource(s) over the second connection 832. In one example where the secondary connection 832 uses TCP as a transport, the wake-up signal may be a TCP packet with a reset (RST) bit set in the TCP header sent by the initiator 822. After the secondary connection 832 has been activated, the initiator 822 may communicate data with the target accelerator resource(s) over the secondary connection 832.

While communication takes place over the secondary connection 832, the initiator 822 attempts to re-activate or recover the primary connection 831 at operation 1110. In embodiments where the fallback trigger is based on a link failure or disconnection, operation 1110 may involve performing a suitable link recovery procedure as are known in the art. In embodiments where the fallback trigger is based on migration procedure, operation 1110 may involve re-activating the primary connection 831 after the migration procedure is finished (e.g., in response to receipt of an interrupt or other indicator from the destination computing platform 102). In these embodiments, a wake-up signal for reactivating the primary connection 831 may be sent to the target accelerator resource(s) over the secondary connection 832 or the primary connection 831. In some embodiments for the migration procedure, the primary connection 831 can be re-established by the initiator 822 using the already established session ID that is being used for the secondary connection 832. In these embodiments, the primary connection 831 essentially establishes the connection using the session ID (in reverse of the connection establishment procedures of process 900 of FIG. 9) since the session ID is already known by the target accelerator resource(s). In this way, the primary connection 831 may be associated (or re-associated) with the secondary connection 832 after the migration process has been completed in cases where the primary connection 831 was disconnected or broken during the migration process.

At operation 1112, the initiator 822 determines whether the primary connection 832 has been successfully reactivated. If at operation 1112 the initiator 822 determines that reactivation attempt was unsuccessful, then the initiator 822 loops back to operation 1110 to re-attempt reactivation of the primary connection 832. If at operation 1112 the initiator 822 determines that reactivation attempt was successful, then the initiator 822 proceeds to operation 1114 to deactivate the secondary connection 832. After the secondary connection 832 has been deactivated, the initiator 822 may proceed back to operation 1102 to repeat process 1100.

III. EXAMPLES

Illustrative examples of the devices, systems, and methods disclosed herein are provided below. An embodiment of the devices, systems, and methods may include any one or more, and any combination of, the examples described below.

Example 1 includes at least one computer readable storage medium (CRSM) comprising instructions stored thereon, wherein execution of the instructions is to cause a computing platform to: operate an initiator application hosted by the computing platform to establish, for another application hosted by the computing platform, a communication session with a hardware accelerator remote from the computing platform over a network fabric, wherein the communication session comprises at least two connections to the hardware accelerator, the at least two connections at least including a first connection having a first transport layer and a second connection having a second transport layer that is different than the first transport layer; and communicate data, for the other application, with the hardware accelerator over the first connection or the second connection.

Example 2 includes the at least one CRSM of example 1 and/or some other example(s) herein, wherein, to establish the communication session with the hardware accelerator, execution of the instructions is to cause the computing platform to operate the initiator application to: perform an establishment procedure with the hardware accelerator for the first connection; and receive a session identifier (ID) from the hardware accelerator during the establishment procedure.

Example 3 includes the at least one CRSM of example 2 and/or some other example(s) herein, wherein the establishment procedure is a first establishment procedure and, to establish the communication session with the hardware accelerator, execution of the instructions is to cause the computing platform to operate the initiator application to: perform a second establishment procedure with the hardware accelerator for the second connection; and send the session ID to the hardware accelerator during the second establishment procedure.

Example 4 includes the at least one CRSM of examples 1-3 and/or some other example(s) herein, wherein the computing platform is communicatively coupled with network interface circuitry (NIC) and, to establish the communication session with the hardware accelerator, execution of the instructions is to cause the computing platform to operate the initiator application to: instruct the NIC to establish the first connection with the hardware accelerator; obtain a session ID from the NIC upon establishment of the first connection with the hardware accelerator; and send the session ID to the hardware accelerator during an establishment procedure for the second connection.

Example 5 includes the at least one CRSM of example 4 and/or some other example(s) herein, wherein the first transport layer is implemented by the NIC, and the second transport layer is implemented by the computing platform.

Example 6 includes the at least one CRSM of examples 1-5 and/or some other example(s) herein, wherein execution of the instructions is to cause the computing platform to operate the initiator application to: detect a link failure of the first connection; activate the second connection; send the session ID to the hardware accelerator over the second connection; and attempt reactivation of the first connection.

Example 7 includes the at least one CRSM of examples 1-6 and/or some other example(s) herein, wherein execution of the instructions is to cause the computing platform to: operate a virtual machine (VM) or an application container, wherein the initiator application and the other application are to operate within the VM or the application container.

Example 8 includes the at least one CRSM of example 7 and/or some other example(s) herein, wherein execution of the instructions is to cause the computing platform to operate the initiator application to: detect a trigger for migration of the VM or the application container to another computing system; before the migration, deactivate the first connection, activate the second connection, and send the session ID to the hardware accelerator over the second connection; and after the migration, deactivate the second connection, and re-activate the first connection, and send the session ID to the remote hardware accelerator over the first connection.

Example 9 includes the at least one CRSM of examples 1-8 and/or some other example(s) herein, wherein the first transport layer is a Remote Direct Memory Access (RDMA) based transport layer, and the second transport layer is a Transmission Control Protocol (TCP) layer.

Example 10 includes the at least one CRSM of examples 1-9 and/or some other example(s) herein, wherein the computing platform is in a server computer system; the hardware accelerator is a field programmable gate array (FPGA), (ASIC), or programmable System-on-Chip (SoC); and the network fabric is an Ethernet fabric or a fiber channel (FC) fabric.

Example 11 includes hardware accelerator circuitry comprising: one or more configurable logic blocks (CLBs) configured with logic arranged to: establish a communication session over a network fabric with a computing platform remote from the hardware accelerator, wherein the communication session comprises at least two connections to the computing platform, the at least two connections at least including a first connection having a first transport layer and a second connection having a second transport layer that is different than the first transport layer; and obtain data for accelerated execution over the first connection or the second connection.

Example 12 includes the hardware accelerator circuitry of example 11 and/or some other example(s) herein, wherein, to establish the communication session with the computing platform, the logic is arranged to: receive, over the network fabric from the computing platform, a request to establish the first connection; generate a session identifier (ID) based on the request; and send, over the first connection to the computing platform, an acknowledgement (ACK) including the session ID.

Example 13 includes the hardware accelerator circuitry of example 12 and/or some other example(s) herein, wherein the request is a first request, the ACK is a first ACK, and, to establish the communication session with the computing platform, the logic is arranged to: receive, over the network fabric from the computing platform, a second request to establish the second connection, the second request including the session ID; store the session ID in association with a first connection ID of the first connection and a second connection ID of the second connection; and send, over the second connection to the computing platform, a second ACK to the computing platform to indicate successful establishment of the session.

Example 14 includes the hardware accelerator circuitry of example 13 and/or some other example(s) herein, wherein the logic is arranged to: activate the first connection in response to receipt of a control or data packet from the computing platform over the first connection.

Example 15 includes the hardware accelerator circuitry of example 14 and/or some other example(s) herein, wherein the logic is arranged to: activate the second connection in response to detection of a disconnection of the first connection, wherein detection of the disconnection of the first connection is based on expiration of a timer or based on receipt of a disconnection data packet.

Example 16 includes the hardware accelerator circuitry of example 15 and/or some other example(s) herein, wherein the computing platform is a first computing platform, the message is a first message, and the logic is arranged to: receive, over the network fabric from a second computing platform, a second message to re-activate the first connection based on migration of a virtual machine (VM) or an application container from the computing device, the second message including the session ID, and the second computing platform being different than the first computing platform; activate the first connection in response to receipt of the second message.

Example 17 includes the hardware accelerator circuitry of examples 11-16 and/or some other example(s) herein, wherein the first transport layer is a Remote Direct Memory Access (RDMA) based transport layer, and the second transport layer is a Transmission Control Protocol (TCP) layer.

Example 18 includes the hardware accelerator circuitry of examples 11-17 and/or some other example(s) herein, wherein the computing platform is in a server computer system; the hardware accelerator is a field programmable gate array (FPGA), programmable application specific integrated circuit (ASIC), or programmable System-on-Chip (SoC); and the network fabric is an Ethernet fabric or a fibre channel (FC) fabric.

Example 19 includes a hardware accelerator sled, comprising: a plurality of hardware accelerators, wherein individual hardware accelerators of the plurality of hardware accelerators are arranged to accelerate execution of individual workloads offloaded from individual computing platforms remote from the hardware accelerator sled; a controller communicatively coupled with the plurality of hardware accelerator sleds, the controller is arranged to establish, for individual hardware accelerators of the plurality of hardware accelerators, respective communication sessions over a network fabric with the individual computing platforms, wherein each of the respective communication sessions comprise at least two connections at least including a first connection having a first transport layer and a second connection having a second transport layer that is different than the first transport layer; and obtain data for accelerated execution over the first connection or the second connection of the respective communication sessions.

Example 20 includes the hardware accelerator sled of example 19 and/or some other example(s) herein, wherein, to establish the respective communication sessions with the individual computing platforms, the controller y is arranged to: for each respective communication session, receive, from one of the individual computing platforms, a first request to establish the first connection; generate a session identifier (ID) based on the first request; send, to the one of the individual computing platforms, a first acknowledgements (ACK) including the session ID; receive, from the one of the individual computing platforms, a second request to establish the second connection, the second request including the session ID; store the session ID in association with a first connection ID of the first connection and a second connection ID of the second connection; and send, to the one of the individual computing platforms, a second ACK to the computing platform to indicate successful establishment of the session Example 21 includes the hardware accelerator sled of example 20 and/or some other example(s) herein, wherein the controller is arranged to: activate the first connection for communicating the data between the individual computing platforms and the individual hardware accelerators; activate the second connection for communicating the data between the individual computing platforms and the individual hardware accelerators in response to disconnection of the first connection; or activate the second connection for communicating the data between the individual computing platforms and the individual hardware accelerators during migration of a virtual machine (VM) or application container between individual computing platforms.

Example 22 includes the hardware accelerator sled of examples 19-21 and/or some other example(s) herein, further comprising: one or more processors arranged to operate as the controller, and the controller is arranged to establish the respective communication sessions on behalf of the individual hardware accelerators.

Example 23 includes the hardware accelerator sled of examples 19-21 and/or some other example(s) herein, further comprising: network fabric switch circuitry communicatively coupled with the plurality of hardware accelerators, wherein the network fabric switch circuitry includes the controller and is arranged to establish the respective communication sessions on behalf of the individual hardware accelerators.

Example 24 includes the hardware accelerator sled of examples 19-23 and/or some other example(s) herein, wherein the first transport layer is a Remote Direct Memory Access (RDMA) based transport layer, and the second transport layer is a Transmission Control Protocol (TCP) layer.

Example 25 includes the hardware accelerator sled of examples 19-24 and/or some other example(s) herein, wherein the individual computing platforms are individual server computer systems.

Example 26 includes the hardware accelerator sled of examples 19-25 and/or some other example(s) herein, wherein the individual hardware accelerators are field programmable gate array (FPGAs), programmable application specific integrated circuits (ASICs), or programmable System-on-Chips (SoCs).

Example 27 includes the hardware accelerator sled of examples 19-25 and/or some other example(s) herein, wherein the individual hardware accelerators are graphics processing units.

Example 28 includes the hardware accelerator sled of examples 23-27 and/or some other example(s) herein, wherein the network fabric switch circuitry is an Ethernet switch or a fibre channel (FC) switch.

Example 29 includes the hardware accelerator sled of examples 19-28 and/or some other example(s) herein, wherein each of the plurality of hardware accelerators are mounted on one or more carrier boards.

Example 30 includes a rack for mounting electronic equipment, the rack comprising: one or more first rack units comprising the hardware accelerator sled of examples 19-29 and/or one or more carrier boards comprising the hardware accelerator circuitry of examples 11-18; and one or more second rack units comprising one or more server systems, wherein each of the one or more server systems include the individual computing platforms of examples 1-26.

Example 31 includes a method to be performed by an initiator application, the method comprising: establishing, for another application hosted by a computing platform hosting the initiator application, a communication session with a hardware accelerator remote from the computing platform over a network fabric, wherein the communication session comprises at least two connections to the hardware accelerator, the at least two connections at least including a first connection having a first transport layer and a second connection having a second transport layer that is different than the first transport layer; and communicating data, for the other application, with the hardware accelerator over the first connection or the second connection.

Example 32 includes the method of example 31 and/or some other example(s) herein, wherein establishing the communication session with the hardware accelerator comprises: performing an establishment procedure with the hardware accelerator for the first connection; and receiving a session identifier (ID) from the hardware accelerator during the establishment procedure.

Example 33 includes the method of example 32 and/or some other example(s) herein, wherein the establishment procedure is a first establishment procedure and establishing the communication session with the hardware accelerator comprises: performing a second establishment procedure with the hardware accelerator for the second connection; and sending the session ID to the hardware accelerator during the second establishment procedure.

Example 34 includes the method of examples 31-33 and/or some other example(s) herein, wherein the computing platform is communicatively coupled with network interface circuitry (NIC) and establishing the communication session with the hardware accelerator comprises: instructing the NIC to establish the first connection with the hardware accelerator; obtaining a session ID from the NIC upon establishment of the first connection with the hardware accelerator; and sending the session ID to the hardware accelerator during an establishment procedure for the second connection.

Example 35 includes the method of example 34 and/or some other example(s) herein, wherein the first transport layer is implemented by the NIC, and the second transport layer is implemented by the computing platform.

Example 36 includes the method of examples 31-35 and/or some other example(s) herein, further comprising: detecting a link failure of the first connection; activating the second connection; sending the session ID to the hardware accelerator over the second connection; and attempting reactivation of the first connection.

Example 37 includes the method of example 31 and/or some other example(s) herein, further comprising: operating a virtual machine (VM) or an application container, wherein the initiator application and the other application are to operate within the VM or the application container.

Example 38 includes the method of example 37 and/or some other example(s) herein, further comprising: detecting a trigger for migration of the VM or the application container to another computing system; before the migration, deactivating the first connection, activating the second connection, and sending the session ID to the hardware accelerator over the second connection; and after the migration, deactivating the second connection, and re-activating the first connection, and sending the session ID to the remote hardware accelerator over the first connection. In example 38, the initiator application is operated by another computing platform after the migration.

Example 39 includes the method of examples 31-38 and/or some other example(s) herein, wherein the first transport layer is a Remote Direct Memory Access (RDMA) based transport layer, and the second transport layer is a Transmission Control Protocol (TCP) layer.

Example 40 includes the method of examples 31-39 and/or some other example(s) herein, wherein the computing platform is in a server computer system; the hardware accelerator is a field programmable gate array (FPGA), (ASIC), or programmable System-on-Chip (SoC); and the network fabric is an Ethernet fabric or a fibre channel (FC) fabric.

Example 41 includes a method to be performed by a hardware accelerator, the method comprising: establishing a communication session over a network fabric with a computing platform remote from the hardware accelerator, wherein the communication session comprises at least two connections to the computing platform, the at least two connections at least including a first connection having a first transport layer and a second connection having a second transport layer that is different than the first transport layer; and obtaining data for accelerated execution over the first connection or the second connection.

Example 42 includes the method of example 41 and/or some other example(s) herein, wherein establishing the communication session with the computing platform comprises: receiving, over the network fabric from the computing platform, a request to establish the first connection; generating a session identifier (ID) based on the request; and sending, over the first connection to the computing platform, an acknowledgement (ACK) including the session ID.

Example 43 includes the method of example 42 and/or some other example(s) herein, wherein the request is a first request, the ACK is a first ACK, and establishing the communication session with the computing platform comprises: receiving, over the network fabric from the computing platform, a second request to establish the second connection, the second request including the session ID; storing the session ID in association with a first connection ID of the first connection and a second connection ID of the second connection; and sending, over the second connection to the computing platform, a second ACK to the computing platform to indicate successful establishment of the session.

Example 44 includes the method of example 43 and/or some other example(s) herein, further comprising: activating the first connection in response to receipt of a control or data packet from the computing platform over the first connection.

Example 45 includes the method of example 44 and/or some other example(s) herein, further comprising: activating the second connection in response to detection of a disconnection of the first connection, wherein detection of the disconnection of the first connection is based on expiration of a timer or based on receipt of a disconnection data packet.

Example 46 includes the method of example 45 and/or some other example(s) herein, wherein the computing platform is a first computing platform, the message is a first message, and the logic is arranged to: receive, over the network fabric from a second computing platform, a second message to re-activate the first connection based on migration of a virtual machine (VM) or an application container from the computing device, the second message including the session ID, and the second computing platform being different than the first computing platform; and activate the first connection in response to receipt of the second message.

Example 47 includes the method of examples 41-46 and/or some other example(s) herein, wherein the first transport layer is a Remote Direct Memory Access (RDMA) based transport layer, and the second transport layer is a Transmission Control Protocol (TCP) layer.

Example 48 includes the method of examples 41-47 and/or some other example(s) herein, wherein the computing platform is in a server computer system; the hardware accelerator is a field programmable gate array (FPGA), programmable application specific integrated circuit (ASIC), or programmable System-on-Chip (SoC); and the network fabric is an Ethernet fabric or a fibre channel (FC) fabric.

Example 49 includes a method to be performed by a controller of a hardware accelerator sled, wherein the hardware accelerator sled comprises a plurality of hardware accelerators communicatively coupled with the controller, wherein individual hardware accelerators of the plurality of hardware accelerators are arranged to accelerate execution of individual workloads offloaded from individual computing platforms remote from the hardware accelerator sled, and the plurality of hardware accelerator sleds, and the method comprises: establishing, by the controller for individual hardware accelerators of the plurality of hardware accelerators, respective communication sessions over a network fabric with the individual computing platforms, wherein each of the respective communication sessions comprise at least two connections at least including a first connection having a first transport layer and a second connection having a second transport layer that is different than the first transport layer; and obtaining, by the controller, data for accelerated execution over the first connection or the second connection of the respective communication sessions.

Example 50 includes the method of example 49 and/or some other example(s) herein, wherein establishing the respective communication sessions with the individual computing platforms comprises: for each respective communication session, receiving, by the controller from one of the individual computing platforms, a first request to establish the first connection; generating, by the controller a session identifier (ID) based on the first request; sending, by the controller to the one of the individual computing platforms, a first acknowledgements (ACK) including the session ID; receiving, by the controller from the one of the individual computing platforms, a second request to establish the second connection, the second request including the session ID; storing, by the controller the session ID in association with a first connection ID of the first connection and a second connection ID of the second connection; and sending, by the controller, to the one of the individual computing platforms, a second ACK to the computing platform to indicate successful establishment of the session Example 51 includes the method of example 50 and/or some other example(s) herein, further comprising: activating, by the controller, the first connection for communicating the data between the individual computing platforms and the individual hardware accelerators; activating, by the controller, the second connection for communicating the data between the individual computing platforms and the individual hardware accelerators in response to disconnection of the first connection; or activating, by the controller, the second connection for communicating the data between the individual computing platforms and the individual hardware accelerators during migration of a virtual machine (VM) or application container between individual computing platforms.

Example 52 includes the method of examples 49-51, wherein the hardware accelerator sled comprises one or more processors arranged to operate as the controller, and the method comprises establishing, by the controller, the respective communication sessions on behalf of the individual hardware accelerators.

Example 53 includes the method of examples 49-51 and/or some other example(s) herein, wherein the hardware accelerator sled comprises network fabric switch circuitry communicatively coupled with the plurality of hardware accelerators, wherein the network fabric switch circuitry includes the controller, and the method comprises establishing, by the controller, the respective communication sessions on behalf of the individual hardware accelerators.

Example 54 includes the method of examples 49-53 and/or some other example(s) herein, wherein the first transport layer is a Remote Direct Memory Access (RDMA) based transport layer, and the second transport layer is a Transmission Control Protocol (TCP) layer.

Example 55 includes the method of examples 49-54 and/or some other example(s) herein, wherein the individual computing platforms are individual server computer systems.

Example 56 includes the method sled of examples 49-55 and/or some other example(s) herein, wherein the individual hardware accelerators are field programmable gate array (FPGAs), programmable application specific integrated circuits (ASICs), or programmable System-on-Chips (SoCs).

Example 57 includes the method sled of examples 49-55 and/or some other example(s) herein, wherein the individual hardware accelerators are graphics processing units.

Example 58 includes the method sled of examples 53-57 and/or some other example(s) herein, wherein the network fabric switch circuitry is an Ethernet switch or a fibre channel (FC) switch.

Example 59 includes the method of examples 49-58 and/or some other example(s) herein, wherein each of the plurality of hardware accelerators are mounted on one or more carrier boards.

Example 60 includes rack mounting means for mounting electronic equipment, the rack mounting means comprising: means for mounting or enclosing the hardware accelerator sled of examples 19-29 and/or one or more carrier boards comprising the hardware accelerator circuitry of examples 11-18; and means for mounting or enclosing one or more server systems, wherein each of the one or more server systems include the individual computing platforms of examples 1-26.

Example 61 includes a compute device for remotely accessing an accelerator device of an accelerator sled, the compute device comprising a processor; a memory comprising a plurality of instructions stored thereon that, when executed, cause the compute device to receive a message from an application executing on the compute device; generate a command capsule based on the message; send the command capsule to the accelerator sled without instruction from the application indicating that the message should be sent to the accelerator sled; receive a response command capsule from the accelerator sled; extract response data from the response command capsule; and pass the response data to the application.

Example 62 includes the subject matter of example 61 and/or some other example(s) herein, wherein to send the command capsule to the accelerator sled comprises to add the command capsule to a send queue; and process the send queue.

Example 63 includes the subject matter of examples 61-62 and/or some other example(s) herein, wherein to add the command capsule to the send queue comprises to add the command capsule to a low-latency data queue based on the message.

Example 64 includes the subject matter of examples 61-63 and/or some other example(s) herein, wherein the plurality of instructions further cause the compute device to receive a second message from the application executing on the compute device; generate a second command capsule based on the second message; add the second command capsule to a bulk data queue based on the second message prior to addition of the command capsule to the low-latency data queue; and send the second command capsule after the command capsule is sent.

Example 65 includes the subject matter of examples 61-64 and/or some other example(s) herein, wherein to send the command capsule to the accelerator sled comprises to determine whether the message is a control command; add, in response to a determination that the message is the control command, the command capsule to a control path send queue; and add, in response to a determination that the message is the control command, the command capsule to a data path send queue.

Example 66 includes the subject matter of examples 61-65 and/or some other example(s) herein, wherein the compute device comprises a plurality of processors, wherein to determine the message to be sent to from the application to the accelerator device comprises to determine, by the processor, the message to be sent from the application to the accelerator device, and wherein to send the command capsule to the accelerator sled comprises to add the command capsule to a send queue associated with the processor based on the association of the processor with the determination of the message, wherein the compute device comprises one or more send queues not associated with the processor.

Example 67 includes the subject matter of examples 61-66 and/or some other example(s) herein, wherein the command capsule comprises a command header portion and a data portion.

Example 68 includes the subject matter of examples 61-67 and/or some other example(s) herein, wherein to send the command capsule to the accelerator sled comprises to send the command capsule to the accelerator sled with use of remote direct memory access (RDMA), and wherein to receive the response command capsule from the accelerator sled comprises to receive an RDMA command from the accelerator sled.

Example 69 includes the subject matter of examples 61-68 and/or some other example(s) herein, and further including a local accelerator device, wherein the plurality of instructions further causes the compute device to determine whether the message should be sent to the local accelerator device or to the accelerator device of the accelerator sled without instruction from the application indicating that the message should be sent to the accelerator sled, wherein to generate the command capsule based on the received message comprises to generate, in response to a determination that the message should be sent to the accelerator device of the accelerator sled, the command capsule based on the received message; receive a second message from the application executing on the compute device; send the second message to the local accelerator device without instruction from the application indicating whether the second message should be sent to the accelerator sled; receive second response data from the local accelerator device; and pass the second response data to the application.

Example 70 includes the subject matter of examples 61-69 and/or some other example(s) herein, wherein the local accelerator device comprises an FPGA, an ASIC, a pSoC, or a GPU.

Example 71 includes the subject matter of examples 61-70 and/or some other example(s) herein, wherein the accelerator device comprises an FPGA, an ASIC, a pSoC, or a GPU.

Example 72 includes a method for remotely accessing an accelerator device of an accelerator sled by a compute device, the method comprising receiving, by an accelerator manager of the compute device, a message from an application executing on the compute device; generating, by the accelerator manager, a command capsule based on the message; sending, by the accelerator manager, the command capsule to the accelerator sled without instruction from the application indicating that the message should be sent to the accelerator sled; receiving, by the accelerator manager, a response command capsule from the accelerator sled; extracting, by the accelerator manager, response data from the response command capsule; and passing, by the compute device, the response data from the accelerator manager to the application.

Example 73 includes the subject matter of Example 72 and/or some other example(s) herein, wherein sending the command capsule to the accelerator sled comprises adding the command capsule to a send queue; and processing the send queue.

Example 74 includes the subject matter of examples 72 and 73 and/or some other example(s) herein, wherein adding the command capsule to the send queue comprises adding the command capsule to a low-latency data queue based on the message.

Example 75 includes the subject matter of examples 72-74 and/or some other example(s) herein, further comprising receiving, by the accelerator manager, a second message from an application executing on the compute device; generating, by the accelerator manager, a second command capsule based on the second message; adding, by the compute device, the second command capsule to a bulk data queue based on the second message prior to addition of the command capsule to the low-latency data queue; and sending, by the compute device, the second command capsule after the command capsule is sent.

Example 76 includes the subject matter of examples 72-75 and/or some other example(s) herein, wherein sending the command capsule to the accelerator sled comprises determining whether the message is a control command; adding, in response to a determination that the message is the control command, the command capsule to a control path send queue; and adding, in response to a determination that the message is the control command, the command capsule to a data path send queue.

Example 77 includes the subject matter of examples 72-76 and/or some other example(s) herein, wherein the compute device comprises a plurality of processors, wherein to determine the message to be sent to from the application to the accelerator device comprises to determine, by a processor of the plurality of processors, the message to be sent from the application to the accelerator device, and wherein to send the command capsule to the accelerator sled comprises to add the command capsule to a send queue associated with the processor based on the association of the processor with the determination of the message, wherein the compute device comprises one or more send queues not associated with the processor.

Example 78 includes the subject matter of examples 72-77 and/or some other example(s) herein, wherein the command capsule comprises a command header portion and a data portion.

Example 79 includes the subject matter of examples 72-78 and/or some other example(s) herein, wherein sending, by the accelerator manager, the command capsule to the accelerator sled comprises sending the command capsule to the accelerator sled with use of remote direct memory access (RDMA), and wherein receiving, by the accelerator manager, the response command capsule from the accelerator sled comprises receiving, by the accelerator manager, an RDMA command from the accelerator sled.

Example 80 includes the subject matter of examples 72-79 and/or some other example(s) herein, wherein the compute device further comprises a local accelerator device, the method further comprising determining whether the message should be sent to the local accelerator device or to the accelerator device of the accelerator sled without instruction from the application indicating that the message should be sent to the accelerator sled, wherein generating the command capsule based on the received message comprises generating, in response to a determination that the message should be sent to the accelerator device of the accelerator sled, the command capsule based on the received message; receiving, by the accelerator manager, a second message from the application executing on the compute device; sending, by the accelerator manager, the second message to the local accelerator device without instruction from the application indicating that the second message should be sent to the accelerator sled; receiving, by the accelerator manager, second response data from the local accelerator device; and passing, by the compute device, the second response data from the accelerator manager to the application.

Example 81 includes the subject matter of examples 72-80 and/or some other example(s) herein, wherein the local accelerator device comprises an FPGA, an ASIC, a pSoC, or a GPU.

Example 82 includes the subject matter of examples 72-81 and/or some other example(s) herein, wherein the accelerator device comprises an FPGA, an ASIC, a pSoC, or a GPU.

Example 83 includes a compute device for remotely accessing an accelerator device of an accelerator sled, the compute device comprising means for receiving a message from an application executing on the compute device; means for generating a command capsule based on the message; circuitry for sending the command capsule to the accelerator sled without instruction from the application indicating that the message should be sent to the accelerator sled; circuitry for receiving a response command capsule from the accelerator sled; means for extracting response data from the response command capsule; and means for passing the response data to the application.

Example 84 includes the subject matter of Example 83 and/or some other example(s) herein, wherein the circuitry for sending the command capsule to the accelerator sled comprises means for adding the command capsule to a send queue; and means for processing the send queue.

Example 85 includes the subject matter of examples 83-84 and/or some other example(s) herein, wherein the means for adding the command capsule to the send queue comprises means for adding the command capsule to a low-latency data queue based on the message.

Example 86 includes the subject matter of examples 83-85 and/or some other example(s) herein, and further including means for receiving a second message from the application executing on the compute device; means for generating a second command capsule based on the second message; means for adding the second command capsule to a bulk data queue based on the second message prior to addition of the command capsule to the low-latency data queue; and circuitry for sending the second command capsule after the command capsule is sent.

Example 87 includes the subject matter of examples 83-86 and/or some other example(s) herein, wherein the circuitry for sending the command capsule to the accelerator sled comprises means for determining whether the message is a control command; means for adding, in response to a determination that the message is the control command, the command capsule to a control path send queue; and means for adding, in response to a determination that the message is the control command, the command capsule to a data path send queue.

Example 88 includes the subject matter of examples 83-87 and/or some other example(s) herein, wherein the compute device comprises a plurality of processors, wherein the means for determining the message to be sent to from the application to the accelerator device comprises means for determining, by a processor of the plurality of processors, the message to be sent from the application to the accelerator device, and wherein the circuitry for sending the command capsule to the accelerator sled comprises means for adding the command capsule to a send queue associated with the processor based on the association of the processor with the determination of the message, wherein the compute device comprises one or more send queues not associated with the processor.

Example 89 includes the subject matter of examples 83-88 and/or some other example(s) herein, wherein the command capsule comprises a command header portion and a data portion.

Example 90 includes the subject matter of examples 83-89 and/or some other example(s) herein, wherein the circuitry for sending the command capsule to the accelerator sled comprises circuitry for sending the command capsule to the accelerator sled with use of remote direct memory access (RDMA), and wherein the circuitry for receiving the response command capsule from the accelerator sled comprises circuitry for receiving an RDMA command from the accelerator sled.

Example 91 includes the subject matter of examples 83-90 and/or some other example(s) herein, wherein the compute device further comprises a local accelerator device, the compute device comprises means for determining whether the message should be sent to the local accelerator device or to the accelerator device of the accelerator sled without instruction from the application indicating that the message should be sent to the accelerator sled, wherein the means for generating the command capsule based on the received message comprises means for generating, in response to a determination that the message should be sent to the accelerator device of the accelerator sled, the command capsule based on the received message; means for receiving a second message from the application executing on the compute device; circuitry for sending the second message from the accelerator manager to the local accelerator device without instruction from the application indicating that the second message should be sent to the accelerator sled; circuitry for receiving second response data from the local accelerator device; and means for passing the second response data to the application.

Example 92 includes the subject matter of examples 83-91 and/or some other example(s) herein, wherein the local accelerator device comprises an FPGA, an ASIC, a pSoC, or a GPU.

Example 93 includes the subject matter of examples 83-V44 and/or some other example(s) herein, wherein the accelerator device comprises an FPGA, an ASIC, a pSoC, or a GPU.

Example 94 includes an apparatus comprising means to perform one or more elements of a method described in or related to any of examples 1-93, or any other method or process described herein.

Example 95 includes an apparatus comprising logic, modules, or circuitry to perform one or more elements of a method described in or related to any of examples 1-93, or any other method or process described herein.

Example 96 includes a method, technique, or process as described in or related to any of examples 1-93, or portions or parts thereof.

Example 97 includes an apparatus comprising: one or more processors and one or more computer readable media comprising instructions that, when executed by the one or more processors, cause the one or more processors to perform the method, techniques, or process as described in or related to any of examples 1-93, or portions thereof.

Example 98 includes a signal as described in or related to any of examples 1-93, or portions or parts thereof.

Example 99 includes a signal in a wireless network as shown and described herein.

Example 100 includes a message, a datagram, a frame, a packet, and/or a protocol data unit (PDU) as described in or related to any of examples 1-93, or portions or parts thereof.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that each block of the flowchart illustrations and/or block diagrams, and combinations of blocks in the flowchart illustrations and/or block diagrams, may be implemented in hardware, firmware, software, or any combination thereof. The disclosed embodiments may be implemented as a computer process, a computing system, or as an article of manufacture such as a computer program product of computer readable media. The computer program product may include one or more transitory or non-transitory machine-readable (e.g., computer-readable) media comprising encoded computer program instructions for executing the computer process, which is readable and/or executable by one or more processors of a computer system. The machine-readable storage medium may be embodied as any storage device, mechanism, or other physical structure for storing or transmitting information in a form readable by a machine (e.g., a volatile or non-volatile memory, a media disc, or other media device). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" is one or more independent electronic circuits packaged onto a circuit board, SoC, System-in-Package (SiP), etc., configured to provide a basic function within a computer system. The term "module" may refer to, be part of, or include an FPD, ASIC, a processor (shared, dedicated, or group) and/or memory (shared, dedicated, or group) that execute one or more software or firmware programs, a combinational logic circuit, and/or other suitable components that provide the described functionality.

As used herein, the terms "instantiate," "instantiation," and the like may refer to the creation of an instance, and an "instance" may refer to a concrete occurrence of an object, which may occur, for example, during execution of program code. As used herein, a "database object", "data object", or the like may refer to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" may refer to a resource hosted by a remote entity (e.g., a cloud computing service) and accessible over a network. The term "on-device resource" may refer to a resource hosted inside a device and enabling access to the device, and thus, to the related physical entity.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to (1) a distinct component of an architecture or device, or (2) information transferred as a payload.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices for the purpose of transmitting and receiving information.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiments were chosen and described in order to best explain the principles of the disclosure and the practical application, and to enable others of ordinary skill in the art to understand the disclosure for embodiments with various modifications as are suited to the particular use contemplated.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. At least one non-transitory computer readable storage medium (CRSM) comprising instructions stored thereon, wherein execution of the instructions is to cause a computing platform to:

operate an initiator application executed by the computing platform to establish, for another application executed by the computing platform, a communication session with a hardware accelerator remote from the computing platform and communicatively coupled over a network fabric, wherein the communication session comprises at least two concurrent connections to the hardware accelerator, the at least two concurrent connections at least including a first connection having a first transport layer and a second connection having a second transport layer that is different than the first transport layer; and communicate data, for the another application, with the hardware accelerator over the first connection or the second connection.

2. The at least one CRSM of claim 1, wherein, to establish the communication session with the hardware accelerator, execution of the instructions is to cause the computing platform to operate the initiator application to:

perform an establishment procedure with the hardware accelerator for the first connection; and receive a session identifier (ID) from the hardware accelerator during the establishment procedure.

3. The at least one CRSM of claim 2, wherein the establishment procedure is a first establishment procedure and, to establish the communication session with the hardware accelerator, execution of the instructions is to cause the computing platform to operate the initiator application to:
perform a second establishment procedure with the hardware accelerator for the second connection; and
send a session ID to the hardware accelerator during the second establishment procedure.

4. The at least one CRSM of claim 1, wherein the computing platform is communicatively coupled with network interface circuitry (NIC) and, to establish the communication session with the hardware accelerator, execution of the instructions is to cause the computing platform to operate the initiator application to:
instruct the NIC to establish the first connection with the hardware accelerator;
obtain a session ID from the NIC upon establishment of the first connection with the hardware accelerator; and
send the session ID to the hardware accelerator during an establishment procedure for the second connection.

5. The at least one CRSM of claim 4, wherein the first transport layer is implemented by the NIC, and the second transport layer is implemented by the computing platform.

6. The at least one CRSM of claim 1, wherein execution of the instructions is to cause the computing platform to operate the initiator application to:
detect a link failure of the first connection;
activate the second connection;
send a session ID to the hardware accelerator over the second connection; and
attempt reactivation of the first connection.

7. The at least one CRSM of claim 1, wherein execution of the instructions is to cause the computing platform to:
operate a virtual machine (VM) or an application container, wherein the initiator application and the another application are to operate within the VM or the application container.

8. The at least one CRSM of claim 7, wherein execution of the instructions is to cause the computing platform to operate the initiator application to:
detect a trigger for migration of the VM or the application container to another computing system;
before the migration:
deactivate the first connection,
activate the second connection, and
send a session ID to the hardware accelerator over the second connection; and after the migration:
deactivate the second connection, and
re-activate the first connection, and
send the session ID to the remote hardware accelerator over the first connection.

9. The at least one CRSM of claim 1, wherein the first transport layer is a Remote Direct Memory Access (RDMA) based transport layer, and the second transport layer is a Transmission Control Protocol (TCP) layer.

10. The at least one CRSM of claim 1, wherein the computing platform is in a server computer system; the hardware accelerator comprises a field programmable gate array (FPGA), (ASIC), or programmable System-on-Chip (SoC); and the network fabric is an Ethernet fabric or a Fibre channel (FC) fabric.

11. Hardware accelerator circuitry comprising:
one or more configurable logic blocks (CLBs) configured with logic arranged to:
establish a communication session over a network fabric with a computing platform remote from the hardware accelerator circuitry, wherein the communication session comprises at least two concurrent connections to the computing platform, the at least two concurrent connections at least including a first connection having a first transport layer and a second connection having a second transport layer that is different than the first transport layer; and
obtain data for execution by the hardware accelerator circuitry over the first connection or the second connection.

12. The hardware accelerator circuitry of claim 11, wherein, to establish the communication session with the computing platform, the logic is arranged to:
receive, over the network fabric from the computing platform, a request to establish the first connection;
generate a session identifier (ID) based on the request; and
send, over the first connection to the computing platform, an acknowledgement (ACK) including the session ID.

13. The hardware accelerator circuitry of claim 12, wherein the request is a first request, the ACK is a first ACK, and, to establish the communication session with the computing platform, the logic is arranged to:
receive, over the network fabric from the computing platform, a second request to establish the second connection, the second request including the session ID;
store the session ID in association with a first connection ID of the first connection and a second connection ID of the second connection; and
send, over the second connection to the computing platform, a second ACK to the computing platform to indicate successful establishment of the communication session.

14. The hardware accelerator circuitry of claim 13, wherein the logic is arranged to:
activate the first connection in response to receipt of a control or data packet from the computing platform over the first connection.

15. The hardware accelerator circuitry of claim 14, wherein the logic is arranged to:
activate the second connection in response to detection of a disconnection of the first connection, wherein detection of the disconnection of the first connection is based on expiration of a timer or based on receipt of a disconnection data packet.

16. The hardware accelerator circuitry of claim 15, wherein the computing platform is a first computing platform, the disconnection data packet is a first message, and the logic is arranged to:
receive, over the network fabric from a second computing platform, a second message to re-activate the first connection based on migration of a virtual machine (VM) or an application container from the computing platform, the second message including the session ID, and the second computing platform being different than the first computing platform;
activate the first connection in response to receipt of the second message.

17. The hardware accelerator circuitry of claim 11, wherein the first transport layer is a Remote Direct Memory Access (RDMA) based transport layer, and the second transport layer is a Transmission Control Protocol (TCP) layer.

18. The hardware accelerator circuitry of claim 11, wherein the computing platform is in a server computer system; the hardware accelerator circuitry comprises a field programmable gate array (FPGA), programmable application specific integrated circuit (ASIC), or programmable System-on-Chip (SoC); and the network fabric comprises an Ethernet fabric or a Fibre channel (FC) fabric.

19. A hardware accelerator system, comprising:
a plurality of hardware accelerators, wherein individual hardware accelerators of the plurality of hardware accelerators are arranged to accelerate execution of individual workloads offloaded from individual computing platforms remote from the hardware accelerator system;
a controller communicatively coupled with the plurality of hardware accelerators, the controller is arranged to establish, for individual hardware accelerators of the plurality of hardware accelerators, respective communication sessions over a network fabric with the individual computing platforms, wherein at least one of the respective communication sessions comprise at least two concurrent connections at least including a first connection having a first transport layer and a second connection having a second transport layer that is different than the first transport layer; and
obtain data for execution over the first connection or the second connection of the respective communication sessions.

20. The hardware accelerator system of claim 19, wherein, to establish the respective communication sessions with the individual computing platforms, the controller is arranged to:
for at least one respective communication session,
receive, from one of the individual computing platforms, a first request to establish the first connection;
generate a session identifier (ID) based on the first request;
send, to the one of the individual computing platforms, a first acknowledgement (ACK) including the session ID;
receive, from the one of the individual computing platforms, a second request to establish the second connection, the second request including the session ID;
store the session ID in association with a first connection ID of the first connection and a second connection ID of the second connection; and
send, to the one of the individual computing platforms, a second ACK to the computing platform to indicate successful establishment of the session.

21. The hardware accelerator system of claim 20, wherein the controller is arranged to:
activate the first connection to communicate data between the individual computing platforms and the individual hardware accelerators;
activate the second connection to communicate data between the individual computing platforms and the individual hardware accelerators in response to disconnection of the first connection; or
activate the second connection to communicate data between the individual computing platforms and the individual hardware accelerators during migration of a virtual machine (VM) or application container between individual computing platforms.

22. The hardware accelerator system of claim 19, further comprising: one or more processors arranged to operate as the controller, and the controller is arranged to establish the respective communication sessions on behalf of the individual hardware accelerators.

23. The hardware accelerator system of claim 19, further comprising:
network fabric switch circuitry communicatively coupled with the plurality of hardware accelerators, wherein the network fabric switch circuitry includes the controller, and the controller is arranged to establish the respective communication sessions on behalf of the individual hardware accelerators.

24. The hardware accelerator system of claim 23, wherein the individual computing platforms are individual server computer systems; the individual hardware accelerators comprise field programmable gate array (FPGAs), programmable application specific integrated circuits (ASICs), or programmable System-on-Chips (SoCs); and the network fabric switch circuitry is an Ethernet switch or a Fibre channel (FC) switch.

25. The hardware accelerator system of claim 19, wherein the first transport layer is a Remote Direct Memory Access (RDMA) based transport layer, and the second transport layer is a Transmission Control Protocol (TCP) layer.

26. At least one non-transitory computer readable storage medium comprising instructions stored thereon, wherein execution of the instructions is to cause one or more processors to:
provide multiple concurrent communication connections between an application and an accelerator device, wherein a first communication connection of the multiple concurrent communication connections utilizes a first network transport layer protocol and a second communication connection of the multiple communication connections utilizes a second network transport layer protocol and wherein the first network transport layer protocol is different than the second network transport layer protocol.

27. The at least one non-transitory computer readable storage medium of claim 26, wherein:
the application is executed within a virtual machine and the second communication connection is utilized during a migration of a virtual machine for execution on a different processor.

28. The at least one non-transitory computer readable storage medium of claim 26, wherein the first communication connection is not utilized during migration of a virtual machine for execution on a different processor.

29. The at least one non-transitory computer readable storage medium of claim 26, wherein:
the first communication connection is to provide data transfer using Remote Direct Memory Access (RDMA) and
the second communication connection utilizes an emulated network interface card (NIC).

* * * * *